(12) United States Patent
Hymas et al.

(10) Patent No.: US 11,491,705 B2
(45) Date of Patent: Nov. 8, 2022

(54) METAL FIBER COMPOSITE ADDITIVE MANUFACTURING (MFC-AM) AND COMPOSITE STRUCTURES FORMED BY MFC-AM

(71) Applicant: University of Maryland, College Park, College Park, MD (US)

(72) Inventors: David M. Hymas, Annapolis, MD (US); Serguei V. Dessiatoun, Colmar Manor, MD (US); Michael M. Ohadi, Clarksville, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 352 days.

(21) Appl. No.: 16/340,025

(22) PCT Filed: Oct. 6, 2017

(86) PCT No.: PCT/US2017/055521
§ 371 (c)(1),
(2) Date: Apr. 5, 2019

(87) PCT Pub. No.: WO2018/067918
PCT Pub. Date: Apr. 12, 2018

(65) Prior Publication Data
US 2020/0016823 A1  Jan. 16, 2020

Related U.S. Application Data

(60) Provisional application No. 62/528,887, filed on Jul. 5, 2017, provisional application No. 62/405,085, filed on Oct. 6, 2016.

(51) Int. Cl.
*B29C 64/118* (2017.01)
*B29C 64/314* (2017.01)
(Continued)

(52) U.S. Cl.
CPC .......... *B29C 64/118* (2017.08); *B29C 64/209* (2017.08); *B29C 64/295* (2017.08);
(Continued)

(58) Field of Classification Search
CPC ........................... B29C 64/118; B29C 64/314
See application file for complete search history.

(56) References Cited

U.S. PATENT DOCUMENTS 6,808,017 B1   10/2004  Kaellis
6,994,155 B2   2/2006   Dessiatoun et al.
(Continued)

FOREIGN PATENT DOCUMENTS

WO   WO 2016/140909 A1   9/2016

OTHER PUBLICATIONS

Bayless et al., "Wire embedding 3D printer," University of British Columbia, Engineering Physics [online], Apr. 2010 [retrieved on Sep. 28, 2017]. Retrieved from the Internet:<URL: http://www.reprap.org/mediawiki/images/2/25/SpoolHead_FinalReport.pdf>.
(Continued)

*Primary Examiner* — Nicholas R Krasnow
(74) *Attorney, Agent, or Firm* — RowanTree Law Group, PLLC; Frederick F. Rosenberger

(57) ABSTRACT

In a metal fiber composite (MFC) additive manufacturing (AM) method, a layer of polymer structures is deposited using a fused filament fabrication (FFF) printer assembly comprising at least one nozzle. Subsequently, an MFC printer assembly is used to embed a continuous metal fiber into one or more of the polymer structures of the layer. The embedding is achieved by heating the metal fiber and applying pressure to the metal fiber using an embedding surface of the MFC printer assembly. The heated metal fiber melts polymer adjacent thereto, thereby allowing the pressure to embed the metal fiber into the polymer structure.
(Continued)

Using the MFC-AM method, various composite structures can be formed, such as novel heat exchangers that may otherwise be difficult or impossible to fabricate via other manufacturing techniques.

15 Claims, 18 Drawing Sheets

(51) Int. Cl.
    *B29C 64/321*      (2017.01)
    *B29C 64/295*      (2017.01)
    *B29C 64/209*      (2017.01)
    *B33Y 10/00*      (2015.01)
    *B33Y 30/00*      (2015.01)
    *B33Y 40/00*      (2020.01)
    *B33Y 80/00*      (2015.01)
    *B29K 55/02*      (2006.01)
    *B29L 31/18*      (2006.01)

(52) U.S. Cl.
    CPC .......... *B29C 64/314* (2017.08); *B29C 64/321* (2017.08); *B29K 2055/02* (2013.01); *B29L 2031/18* (2013.01); *B33Y 10/00* (2014.12); *B33Y 30/00* (2014.12); *B33Y 40/00* (2014.12); *B33Y 80/00* (2014.12)

(56) References Cited

U.S. PATENT DOCUMENTS

| | | |
|---|---|---|
| 9,156,205 B2 | 10/2015 | Maik et al. |
| 9,370,896 B2 | 6/2016 | Mark |
| 9,511,543 B2 | 12/2016 | Tyler |
| 9,592,660 B2 | 3/2017 | Reese et al. |
| 9,656,429 B1 | 5/2017 | Mantha et al. |
| 10,254,499 B1* | 4/2019 | Cohen ..................... B23K 1/19 |
| 2010/0166493 A1 | 7/2010 | Tipton |
| 2014/0061974 A1* | 3/2014 | Tyler ..................... B29C 64/165 |
| | | 264/401 |
| 2014/0268604 A1* | 9/2014 | Wicker ................. B29C 70/885 |
| | | 361/760 |
| 2014/0291886 A1* | 10/2014 | Mark ..................... B33Y 30/00 |
| | | 264/259 |
| 2014/0328963 A1 | 11/2014 | Mark et al. |
| 2016/0271876 A1* | 9/2016 | Lower .................... B29C 64/386 |
| 2016/0311165 A1 | 10/2016 | Mark et al. |
| 2017/0008235 A1 | 1/2017 | Tyler |
| 2017/0173868 A1* | 6/2017 | Mark .................... B29C 64/106 |
| 2018/0079131 A1* | 3/2018 | Espalin ................. B33Y 10/00 |

OTHER PUBLICATIONS

Francois, J., "Rollerstruder: A filament feeder/driver/extruder," [online], Apr. 2013 [retrieved on Nov. 28, 2017], Retrieved from the Internet:<URL: http://www.tridimake.com/2013/04/rollerstruder-filament-feeder-driver.html>.

International Search Report and Written Opinion, dated Feb. 5, 2018, in International Application No. PCT/US2017/055521.

Saari et al., "Fiber encapsulation additive manufacturing: An enabling technology for 3D printing of electromechanical devices and robotic components," *3D Printing and Additive Manufacturing*, Mar. 2015,2(1): pp. 32-39.

Xia et al., "Fiber encapsulation additive manufacturing: Materials for electrical junction fabrication," *Proceedings of the 27th Annual International Solid Freeform Fabrication Symposium*, 2016, pp. 1345-1358.

* cited by examiner

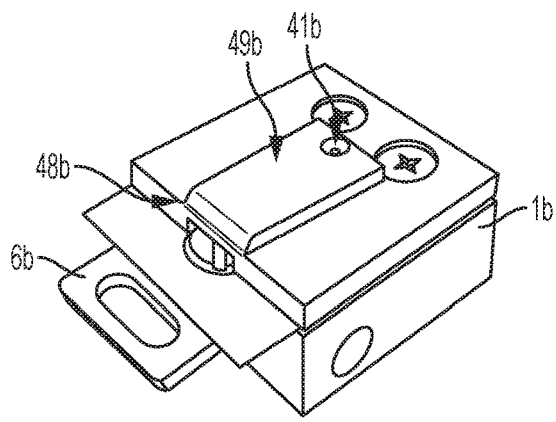
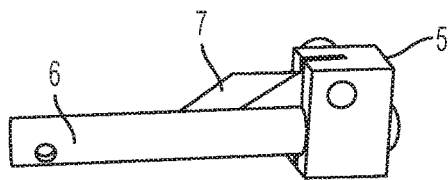
FIG. 9B
FIG. 10
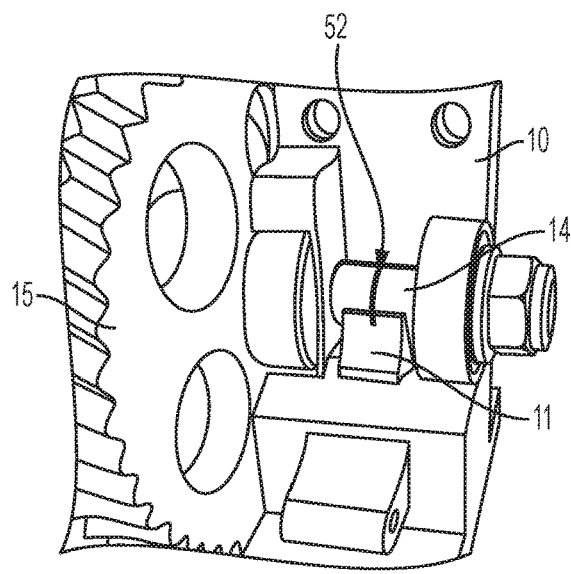
FIG. 11
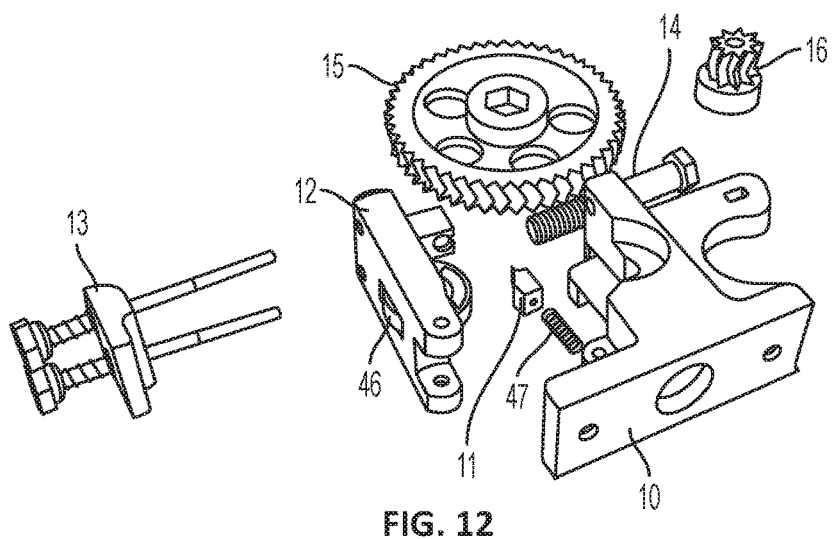
FIG. 12

METAL FIBER COMPOSITE ADDITIVE MANUFACTURING (MFC-AM) AND COMPOSITE STRUCTURES FORMED BY MFC-AM

CROSS-REFERENCE TO RELATED APPLICATIONS

The present application claims the benefit of U.S. Provisional Application No. 62/405,085, filed Oct. 6, 2016 and U.S. Provisional Application No. 62/528,887, filed Jul. 5, 2017, both of which are hereby incorporated by reference herein in their entireties.

STATEMENT REGARDING FEDERALLY SPONSORED RESEARCH

This invention was made with government support under DEAR0000584 awarded by the Department of Energy (DOE), Advanced Research Projects Agency—Energy (ARPA-E). The government has certain rights in the invention.

FIELD

The present disclosure relates generally to additive manufacturing, and more particularly, to systems and methods for additive manufacturing with continuous fibers and structures formed using such systems and methods.

SUMMARY

Embodiments of the disclosed subject matter are directed to an additive manufacturing (AM) methods and systems that allow the formation of composite structures, for example, polymer structures with continuous fibers embedded therein. Through the use of specialized printer assemblies that apply pressure to heated metal fibers, the disclosed methods and systems allow the structures that were heretofore unattainable using conventional AM or other manufacturing techniques. The disclosed methods and systems also allow for the continuous fibers to exist outside of the polymer structures, for example, to provide support for additional layers of the polymer structure or extending through open regions between polymer structures. The disclosed methods and systems can thus be used to build a variety of structures, such as heat exchangers where the metal fibers provide thermal coupling between open volumes defined by the polymer structures.

In one or more embodiments, an additive manufacturing (AM) method includes depositing a layer of polymer structures using a fused filament fabrication (FFF) printer assembly having at least one nozzle. The AM method can further include using a fiber composite (FC) printer assembly, spaced from the at least one nozzle, to embed a continuous fiber into one or more of the polymer structures of the layer. The embedding can include heating the continuous fiber to a temperature such that polymer adjacent to the fiber melts, and applying pressure to the continuous fiber using an embedding surface of the FC printer assembly so as to embed the fiber into the one or more polymer structures. The AM method can be used to form a composite structure, for example, a heat exchanger.

In one or more embodiments, a metal fiber composite (MFC) printer assembly is adapted to be supported with an FFF printer assembly on a common print head of an AM machine. The MFC printer assembly includes a hot block with an outlet and an embedding surface. The outlet is constructed to feed a continuous metal fiber therethrough. The embedding surface is adjacent to the outlet and is constructed to apply at least pressure to the metal fiber extending out of the outlet. An AM manufacturing machine can include the FFF printer assembly, which has at least one nozzle, and the MFC printer assembly.

In one or more embodiments, an AM system includes an FFF printer assembly with one or more polymer deposition nozzles and an MFC printer assembly. The MFC printer assembly can be constructed to simultaneously embed multiple continuous metal fibers into deposited polymer structures. The MFC printer assembly can include a fiber feed system and an embedding plate. The fiber feed system can simultaneously feed the multiple metal fibers to a deposition region. The embedding plate can be disposed proximal to a trailing portion of the fiber feed system and constructed to apply at least pressure to the multiple metal fibers fed to the deposition region.

Objects and advantages of embodiments of the disclosed subject matter will become apparent from the following description when considered in conjunction with the accompanying drawings.

BRIEF DESCRIPTION OF DRAWINGS

Embodiments will hereinafter be described with reference to the accompanying drawings, which have not necessarily been drawn to scale. Where applicable, some features may not be illustrated to assist in the illustration and description of underlying features. Throughout the figures, like reference numerals denote like elements.

FIG. 9B shows another alternative hot block for use in an MFC printer assembly, according to one or more embodiments of the disclosed subject matter.

FIG. 10 shows a cutting assembly for use in an MFC printer assembly, according to one or more embodiments of the disclosed subject matter.

FIG. 11 is a close-up view of aspects of a fiber feed system of an MFC printer assembly, according to one or more embodiments of the disclosed subject matter.

FIG. 12 is an exploded view of a fiber feed system of an MFC printer assembly, according to one or more embodiments of the disclosed subject matter.

FIGS. 22B and 22D are side views of FIGS. 22A and 22C, respectively.

DETAILED DESCRIPTION

In embodiments, a composite structure made of metal fibers in polymer structures can be formed by additive manufacturing (AM) (also known as 3-D printing). In particular, a layer of polymer can be formed using fused filament fabrication (FFF) (also known as Fused Deposition Modeling (FDM)), while continuous fibers can be embedded within polymer structures of the layer using a metal fiber composite (MFC) technique. When the continuous fibers are other than metal fibers, the technique is referred to as a fiber composite (FC) technique.

In the MFC technique, continuous metal fibers are heated and pressure is applied to the fibers contacting the polymer structures. The temperature of the heated fibers melts the portion of the polymer structure contacting the heated fibers, thereby allowing the pressure to embed the fiber within the polymer structure. Additional layers of polymer structures and/or embedded metal fibers can be formed over existing layers by subsequent FFF and MFC applications to form complex composite structures. The embedded metal fibers can provide structural reinforcement to the polymer structures or provide other physical properties not otherwise offered by the polymer structures (e.g., thermal and/or electrical conductivity). For example, the disclosed FFF-MFC AM techniques can be used to form a cross-media heat exchanger, wherein the embedded metal fibers provide an improved thermal connection between volumes separated by the polymer structures.

In the MFC technique, a specialized printer assembly (i.e., an MFC printer assembly) may be provided to apply pressure and/or heat to the continuous metal fiber. For example, the MFC printer assembly can include a feed system for advancing continuous metal fiber from a supply to the deposition area, one or more heating mechanisms for heating the fiber before the deposition area and/or in the deposition area, a fiber cutting mechanism for severing the continuous metal fiber at or near the point of extrusion, and/or a pressure plate that pushes the metal fiber into the current polymer layer. The MFC printer assembly may be mounted together on an existing printer head supporting an FFF printer assembly (e.g., as an add-on to existing AM systems) or mounted on a printer head separate from the FFF printer assembly (e.g., to allow independent positioning).

Figure 1A:
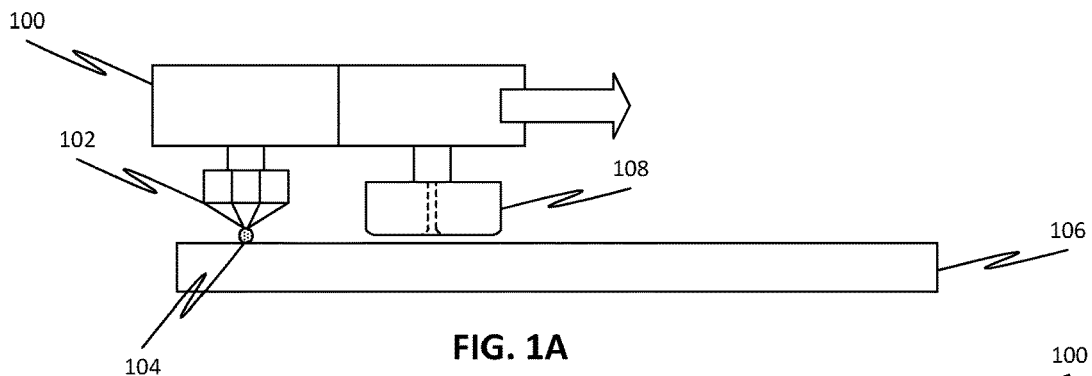
FIGS. 1A-1E are simplified diagrams illustrating polymer and metal fiber deposition by a fused filament fabrication (FFF) and metal fiber composite (MFC) printer assemblies, according to one or more embodiments of the disclosed subject matter.
Figure 1B:
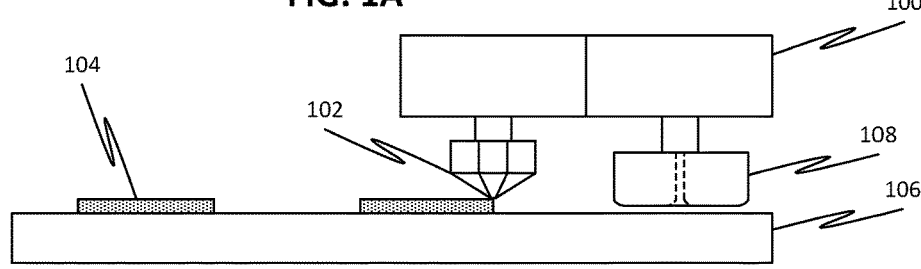

FIGS. 1A-1D illustrate an exemplary process flow for forming a polymer composite according to embodiments of the disclosed subject matter. A common print head 100 supports an FFF printer assembly 102 for extruding polymer 104 to form polymer structures and an MFC printer assembly 108 for embedding continuous metal fibers 112 within the polymer structures. For example, as shown in FIGS. 1A-1B, the FFF printer assembly 102 can first deposit one or more polymer structures onto a print bed 106, which may be movable in one dimension (e.g., perpendicular to the motion of the print head 100, in order to increment between layers) or in multiple dimensions. Operation of the FFF printer assembly may be in a conventional manner, for example, by taking polymer feed stock in the form of filament, using an extruder to melt the polymer filament, and then ejecting the melted polymer via the outlet of a nozzle to form structures on the print bed 106.

Figure 1C:
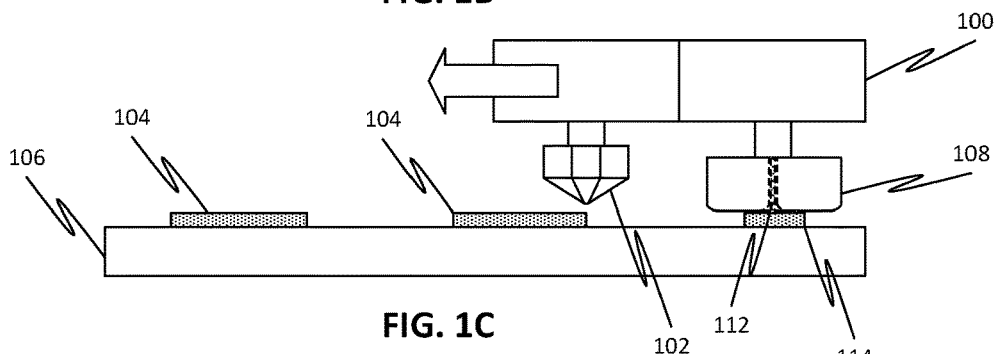
Figure 1D:
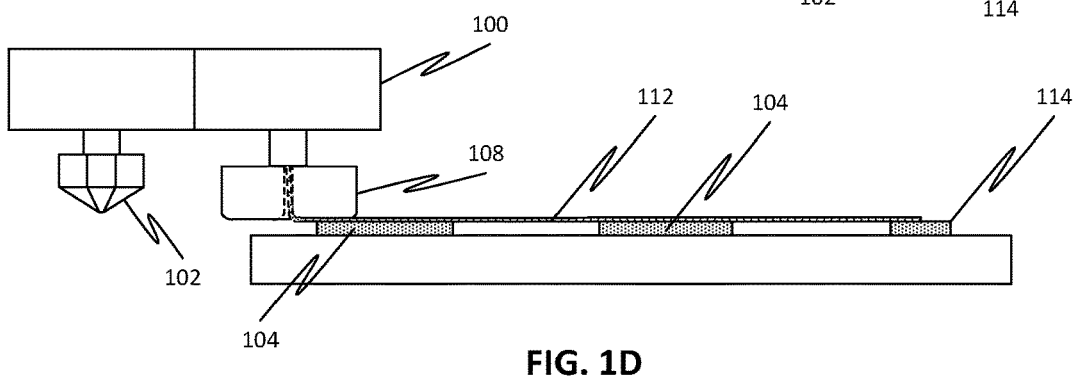
Figure 1E:
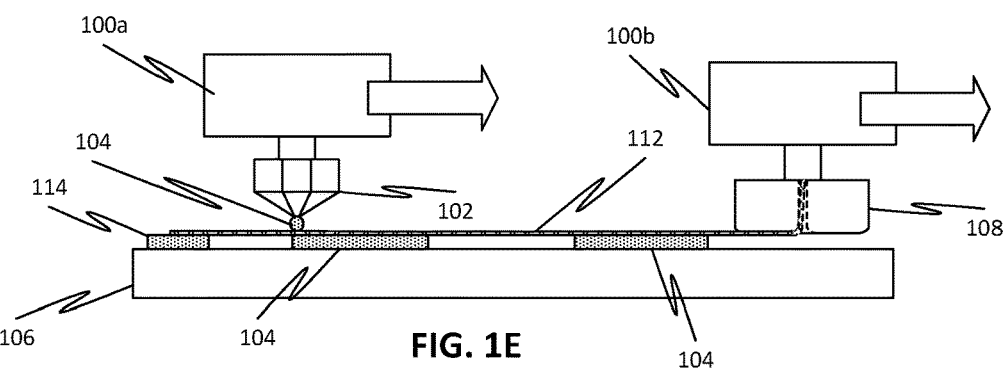

After deposition of the polymer structures 104 forming a layer, the MFC printer assembly 108 can then proceed to embed a continuous metal fiber into an upper surface of the polymer structures 104, as shown in FIG. 1C-1D. As used herein, continuous metal fiber refers to a wire or filament of any cross-sectional geometry (circular or any other geometry) where a majority of the cross-sectional area is formed of a metal material (as opposed to a pultruded fiber) and is continuous along its length perpendicular to the cross-sectional area (at least until severed by the MFC printer assembly). Thus, the continuous metal fiber may be a bare metal material (e.g., solid metal wire), a non-polymer coated metal material (e.g., chrome, ceramic, or metal-oxide coated), or a polymer-coated metal filament (where the polymer has a melting temperature higher than that of the underlying polymer layer, so that the coating is not damaged by the embedding process).

In some embodiments, materials other than metals may be used, for example, where a majority of the cross-sectional area is formed of a non-polymer material, such as glass (e.g., optical fiber) or carbon, or formed of a polymer having a melting temperature higher than that of the underlying polymer structures deposited using the FFF printer assembly. In such embodiments, the source material would simply be considered a continuous fiber, and the embedding may be performed in a manner similar to the disclosed MFC techniques employing continuous metal fibers.

For example, the MFC printer assembly 108 can include an outlet 110 with geometric features that allows the input metal fiber 112 to smoothly transition from a direction roughly perpendicular to the print bed 106 to a direction roughly parallel to the print bed 106. For example, the edge of the outlet 110 can be curved (i.e., have a radius) or chamfered. The MFC printer assembly 108 heats the metal fiber 112 and presses the metal fiber 112 into the upper surface of the polymer structures 104, thereby melting the adjacent polymer and embedding the metal fiber 112 therein. Leading and/or trailing edges of the pressing surface (i.e., embedding surface) of the MFC printer assembly 108 may also be supplied with geometric features that allow the surface to smoothly translate over protruding portions of the underlying polymer structures 104. For example, the edges of the pressing surface can be curved (i.e., have a radius) or chamfered.

To begin the embedding, an initial portion of the continuous metal fiber 112 is connected (e.g., by embedding) to an anchor section 114, which may be a sacrificial polymer structure formed outside of the desired build area, a portion of the polymer structures within the desired build area, or a mechanical anchor within or outside the desired build area. For example, 1-5 cm of the metal fiber may be embedded into a polymer anchor structure. When using a sacrificial polymer structure, the anchor section 114 can be removed after the build process has been completed (i.e., once the entire composite structure is formed), after the anchored fiber 112 has been embedded into other polymer structures (i.e., before full embedding of the anchored fiber within the particular polymer layer has been completed), or at any other time.

The MFC assembly can advance the metal fiber 112 from outlet 110 under tension, thereby allowing the fiber 112 to span regions between structures 104 where no polymer is formed. At the end of embedding a particular fiber 112, a cutting mechanism may sever the continuous fiber proximal to the outlet 110. Deposition of a new fiber 112 can then be initiated (i.e., multiple separate continuous fibers embedded into the same layer of polymer structures) or deposition of a new polymer layer can be initiated. FIGS. 1A-1D can thus be repeated to build up a complex composite structure.

Although the direction of motion of print head 100 in FIGS. 1A-1B is shown as opposite to the direction of motion in FIGS. 1C-1D, this is for illustration purposes only. Other directions are also possible according to one or more contemplated embodiments. Indeed, the ultimate direction and movements of the print head 100 will depend on the desired composite structure design.

Moreover, although the print head 100 is shown as supporting both the FFF assembly 102 and the MFC assembly 108 in FIGS. 1A-1D, embodiments of the disclosed subject matter are not limited thereto. For example, each assembly can be supported on a separate print head that is independently positionable from the other. Thus, an FFF assembly 102 on print head 100a can move independently of the MFC assembly 108 on print head 100b. Such a configuration may allow the print heads 100a, 100b to operate simultaneously, for example, to print features in different regions at the same time. One or more of the print heads 100a, 100b, can also be displaceable in the z-direction (i.e., away from the print bed 106), for example, to allow the print head 100a to deposit polymer 104 in a different layer from the layer in which print head 100b is embedding the metal fiber 112.

Figure 2:
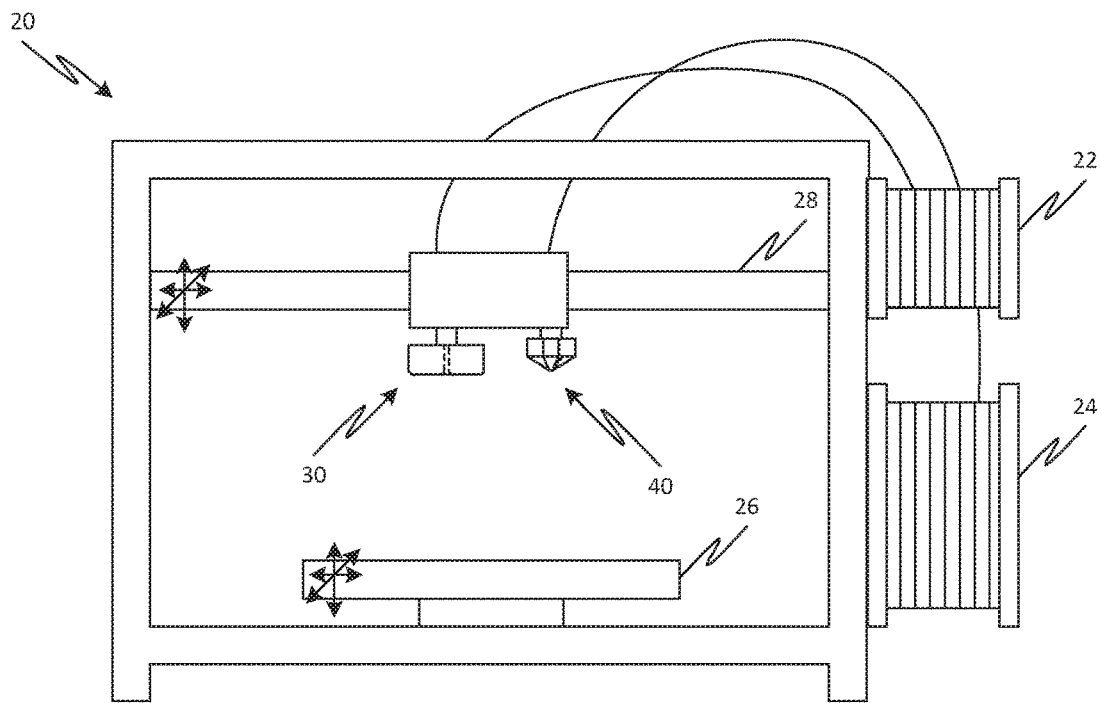
FIG. 2 is simplified illustration of an additive manufacturing (AM) system including FFF and MFC printer assemblies, according to one or more embodiments of the disclosed subject matter.

FIG. 2 shows an AM system 20 that includes an FFF printer assembly 40 and an MFC printer assembly 30 as part of the same print head supported on a moving gantry 28. The FFF printer assembly 40 can receive polymer filament from a filament spool 24, while MFC printer assembly 30 can receive continuous metal fiber (or any other continuous fiber material for embedding) from a spool 22. The gantry 28 can move the print head to position each assembly 30, 40 at respective locations on the print bed 26 to form the desired composite structure. For example, the gantry 28 and the print bed 26 may be capable of motions in three directions (e.g., x-direction parallel to the short side of the page, z-direction parallel to the long side of the page, and y-direction perpendicular to the plane of the page). Alternatively, each may be capable of motion in less than three directions, for example, having the gantry 28 move in only the x-direction and y-direction while the print bed 26 moves in only the z-direction. Although a Cartesian coordinate system is mentioned above, any other coordinate system may also be employed, such as cylindrical or spherical coordinate systems.

Figure 6:
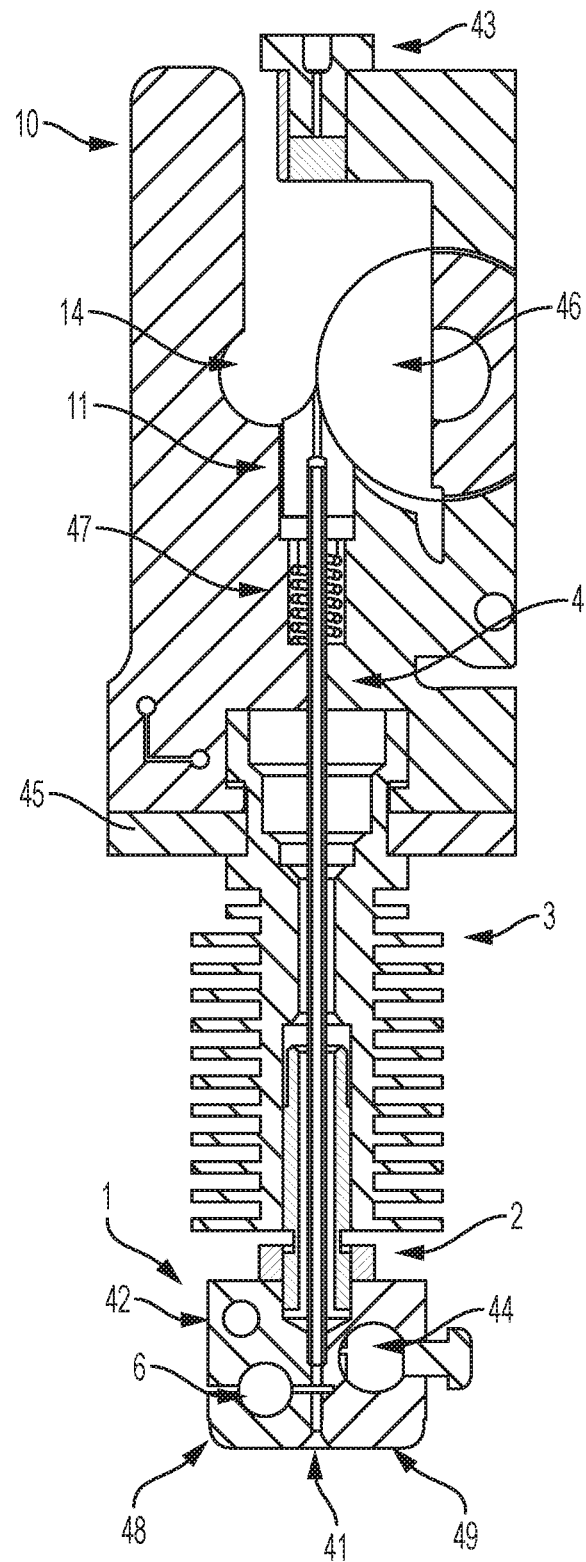
FIG. 6 is a simplified cross-sectional view illustrating main components of an MFC printer assembly, according to one or more embodiments of the disclosed subject matter.

In embodiments, the MFC printer assembly 30 can be constructed as an add-on component to existing FFF-AM systems, where the MFC printer assembly 30 and the FFF printer assembly 40 are supported on the same print head, for example, by an appropriate mounting plate (for example, mounting plate 45 in FIG. 6). This allows the MFC printer assembly 30 to be adaptable to a wide variety of existing AM systems without significant changes to the base platform's mechanical or electrical systems. In one or more embodiments, the components of the MFC printer assembly 30 are provided as a kit for modification of existing AM systems.

Figure 3A:
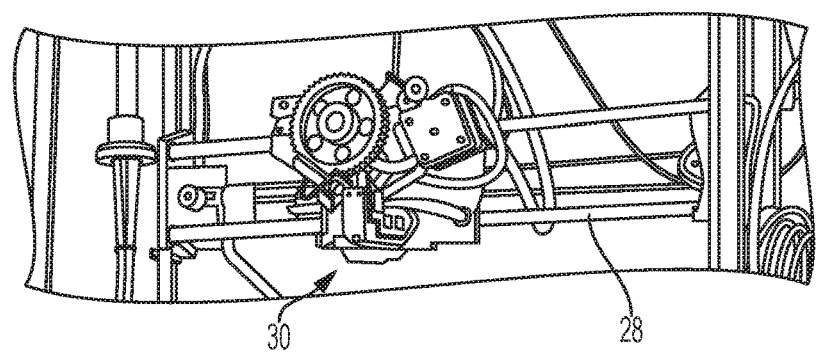
FIGS. 3A-3B are close-up views of a printer head including FFF and MFC printer assemblies, according to one or more embodiments of the disclosed subject matter.
Figure 3B:
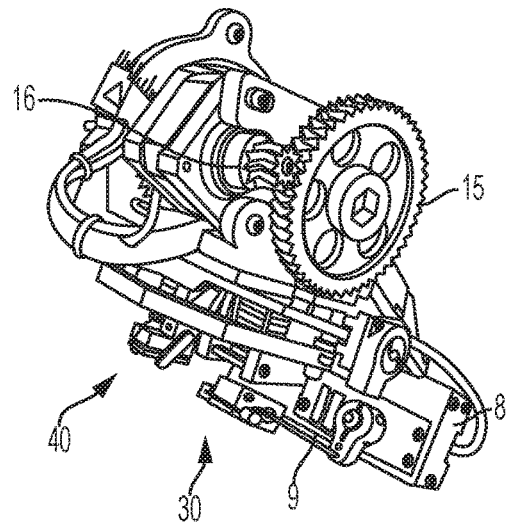
Figure 4:
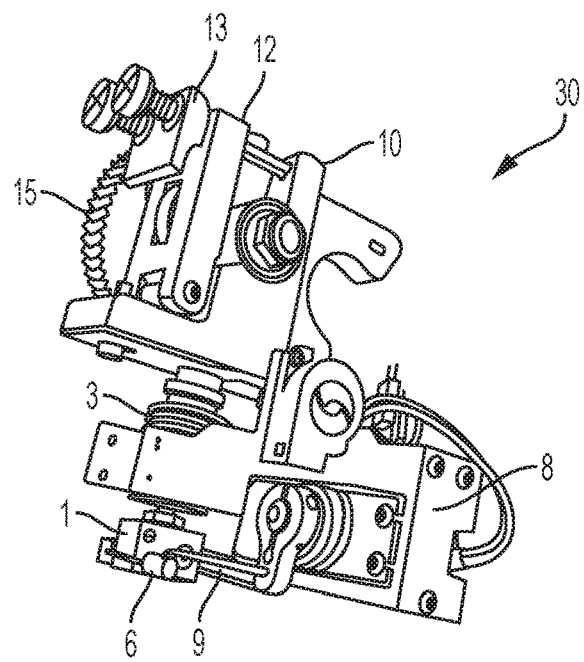
FIG. 4 is a close-up view of an MFC printer assembly, according to one or more embodiments of the disclosed subject matter.
Figure 5:
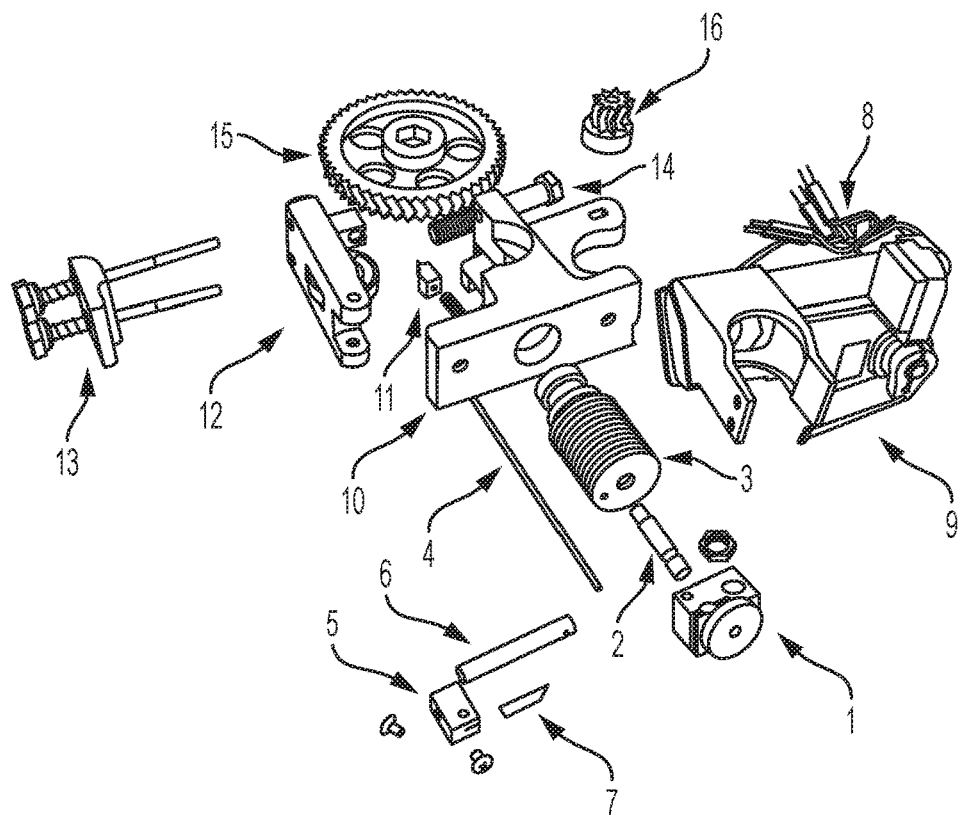
FIG. 5 is an exploded view of an MFC printer assembly, according to one or more embodiments of the disclosed subject matter.
Figure 7:
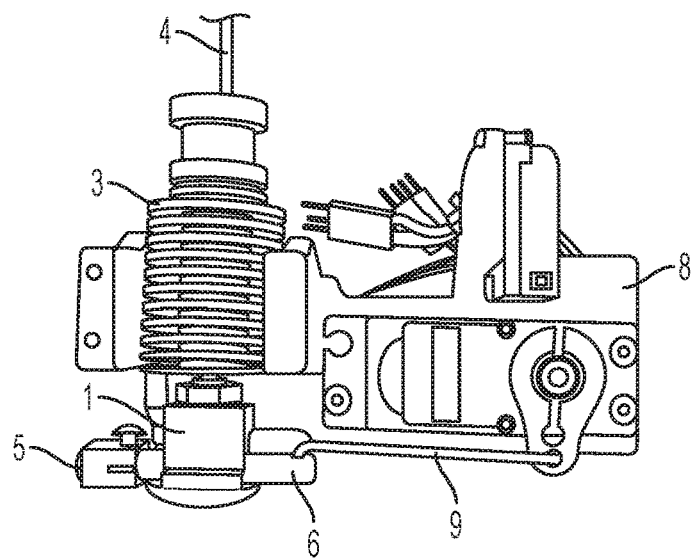
FIG. 7 is a side view of hot side components of an MFC printer assembly, according to one or more embodiments of the disclosed subject matter.
Figure 8:
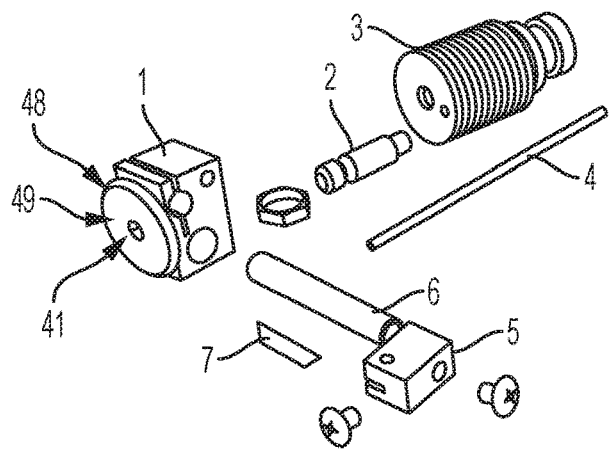
FIG. 8 is an exploded view of the hot side components of an MFC printer assembly, according to one or more embodiments of the disclosed subject matter.

Such an MFC printer assembly 30 is illustrated in FIGS. 3A-12. In particular, FIGS. 3A-3B illustrate a print head with both an FFF printer assembly 40 and an MFC printer assembly 30. FIGS. 4 and 7 illustrates the MFC printer assembly 30 alone, while FIGS. 5, 8, and 12 show exploded views, respectively, of the MFC printer assembly 30, the hot end of the MFC printer assembly 30, and the fiber feed system of the MFC printer assembly 30. FIG. 6 illustrates a cross-sectional representation of the MFC printer assembly 30. FIGS. 9A-9B illustrate variations of a hot block for use in the MFC printer assembly 30, while FIGS. 10-11 show close-up views of a cutting mechanism and the fiber feed system, respectively.

The MFC printer assembly 30 includes a hot end at a part of the print head closest to the print bed and a fiber feed system remote from the hot end. The hot end includes hot block 1, which contains fiber embedding surface 49 adjacent to an outlet 41 through which the continuous metal fiber emerges to contact the underlying polymer layer. As the fiber emerges from outlet 41 a curved (or chamfered) edge of the outlet 41 allows the fiber to smoothly transition from a direction perpendicular to the print bed to a direction parallel to the print bed. The embedding surface 49 of the hot block 1 is then able to apply pressure to the fiber as the hot block moves over the dispensed fiber, thereby embedding the fiber into the underlying polymer layer. For example, the embedding surface 49 can be a substantially flat, low-friction surface.

Alternatively, the embedding surface 49 can be angled (with respect to a plane parallel to the print bed or the build layer) at an initial portion proximal to the outlet, so as to preheat the metal fiber before it contacts the underlying polymer. A trailing portion of the embedding surface 49 distal from the outlet can be flat (i.e., parallel to the print bed or the build layer) so as to embed the fiber into the underlying polymer.

A leading or trailing edge 48 of the hot block may also be curved (or chamfered) in order to allow the hot block to smoothly move over (and press down on) protrusions in the current build layer (e.g., protrusion of the polymer structure into the existing layer or other features). For example, the embedding surface 49 surrounds the outlet 41 in plan view, an entire perimeter (e.g., circumference) of the outlet 41 has a curved (or chamfered) surface, and/or an entire perimeter (e.g., circumference) of the hot block 1 has a curved (or chamfered) surface such that the hot block 1 may embed fibers in an omnidirectional manner.

The hot block 1 can include therein components for controllably heating the fiber as it moves toward outlet 41. For example, a heating mechanism 44 (e.g., heater cartridge) and a temperature sensor 42 (e.g., thermocouple) can be disposed within the hot block 1. Thus, the hot block 1 can apply both heat and apply pressure to the continuous metal fiber at the same time. Alternatively or additionally, heat may be applied to the continuous metal fiber before the outlet 41, such as by components of the feed system, components between the feed system and the hot block, or by walls of the feed channel within the hot block. The heating may be such that the fiber reaches a temperature where the polymer contacting the fiber is melted, thereby allowing the pressure to embed the fiber into the melted portions of the polymer structures.

The hot block 1 may be thermally isolated from the fiber feed system, for example, by a heat break 2 and a heat sink 3. The heat break 2 can thread into top of the hot block 1 at the fiber inlet and join the hot block 1 to the heat sink 3. The construction and arrangement of the heat break 2 can serve to limit the heat flow into the heat sink 3. The heat break 2 can also include a jam nut that allows the distance between the hot block 1 and the active build layer to be adjusted, for example, to accommodate changes in fiber diameter/thickness. The heat sink 3 dissipates heat from the hot block 1 and prevents (or at least reduces) heat from reaching the fiber feed system. A servo/fan mounting bracket 8 can be attached to the heat sink 3 to hold one or more cooling fans for the heat sink and/or other actuating components (e.g., a servo motor 9 for actuating cutting system to sever the continuous metal fiber proximal to outlet 41).

In some contemplated configurations, only portions of the fiber feed system (e.g., stepper motor) may be thermally isolated while other portions are constructed to heat (i.e., preheat) the continuous fiber as it is fed to the hot block 1. For example, a guide tube 4 can extend from the fiber feed system, in particular the post feeder 11, to the hot block 1. This guide tube 4 can act to support the continuous metal fiber (e.g., to keep it from buckling) as well as to preheat the fiber (e.g., via conduction from the hot block 1).

The hot block 1 can further support a cutting mechanism therein, in order to sever the continuous metal fiber as embedding of a particular metal fiber nears completion. For example, the cutting mechanism can include a blade holder 5, a cutter rod 6, and a blade 7 (e.g., a tungsten carbide blade), as shown in FIGS. 5, 7-8, and 10. The cutter rod 6 can pass through a supporting hole in the hot block 1 such that it can slide freely, for example, in a direction crossing the feed direction of the metal fiber through the hot block 1. The cutter rod 6 can be connected at one end to a servo arm 9, which serves to pull or push the cutter rod 6. At an opposite end of the cutter rod 6 is blade holder 5, which supports blade 7 within a corresponding recess (e.g., slit) of the hot block 1. When the servo arm 9 is actuated, the cutter rod 6 slides through hot block 1, pulling the blade 7 into the feed path of the continuous fiber within the hot block (between outlet 41 and an inlet proximal to heat break 2) to sever the fiber. Thus, the metal fiber is cut proximal to the outlet 41 and within hot block 1 when the fiber embedding process is nearing completion.

In this configuration, the cutting mechanism is located within the hot end of the MFC print assembly, which allows the cutting mechanism to sever the wire close to the hot block outlet. This allows a high-level of control over the length and placement of the fiber and can minimize (or at least reduce) the length of metal fiber capable of being embedded. However, embodiments of the disclosed subject matter are not limited thereto. Indeed, other locations and configurations for the cutting mechanism are also possible according to one or more contemplated embodiments. In particular, the cutting mechanism can be placed anywhere after the fiber feed system, which provides the continuous metal fiber to the hot end, including after the hot end (e.g., proximal to outlet 41). For example, the fiber cutting mechanism may be located outside of the print head entirely, such as on the frame of the AM machine or outside of the print head after the point of deposition.

Figure 9A:
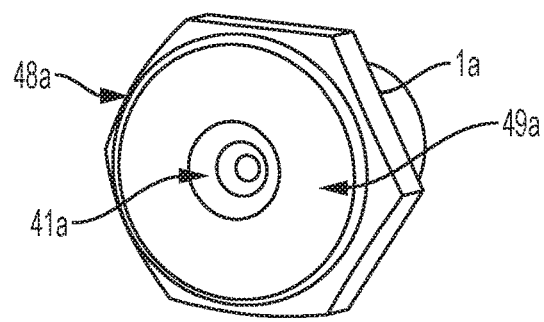
FIG. 9A shows an alternative hot block for use in an MFC printer assembly, according to one or more embodiments of the disclosed subject matter.

Other configurations for the hot block are illustrated in FIGS. 9A-9B. As shown in FIG. 9A, hot block 1*a* has an embedding surface 49*a* surrounding outlet 41*a* and a curved perimeter 48*a*. However, the cutting mechanism (not shown) would be supported separate from hot block 1*a* (e.g., to cut the fiber as it emerges from outlet 41*a* or to cut the fiber before it enters hot block 1*a*). As shown in FIG. 9B, hot block 1*b* has an elongated embedding surface 49*b* at a trailing end of outlet 41*b* and a curved trailing edge 48*b*. A cutting mechanism (of which, only cutter rod 6*b* shown) is disposed internally to the hot block 1*b*.

The fiber feed system is constructed for delivering the continuous metal fiber to the hot block 1 and can be thermally isolated (at least partially) from the hot block 1 by the heat sink 3 and heat break 2. The fiber feed system can include an extruder body 10, a post feeder 11, an idler block 12, an idler tensioner 13, a drive bolt 14, a main gear 15, and a pinion 16. The extruder body 10 is the main support structure of the fiber feed system, connecting to heat sink 3 and serving as a mount to the rest of the AM platform via mounting plate 45. Thus, the mounting plate 45 may support the fiber feed system and the rest of the MFC printing assembly on the print head.

A drive motor (e.g., stepper motor) can be coupled to the fiber feed system (e.g., through pinion 16) to feed continuous metal fiber from the source (e.g., spool 22) to the hot block 1. The pinion 16 drives the main gear 15, which is fixed to and thus drives the drive bolt 14. The drive bolt 14 controls the amount of metal fiber fed into the printed layers via hot block 1. The drive bolt 14 has a groove 52 (see FIG. 11) designed to accommodate the size of the metal fiber therein. When the metal fiber has a circular cross-section, the drive bolt 14 can have a hemispherical groove, where a depth of the groove is greater than half of the diameter of the fiber. Alternatively, when the metal fiber has a non-circular cross-section, the drive bolt 14 can have correspondingly-shaped groove, where a depth of the groove is greater than half of the cross-sectional dimension of the fiber. For example, the depth of the groove is at least 25% greater than a radius or half of the cross-sectional dimension of the fiber.

A post feeder 11 is urged against the drive bolt 14 by a spring 47 and an idler bearing 46 supported by idler block 12, thereby holding the fiber within the groove of the drive bolt 14. The amount of force placed on the fiber via the idler bearing 46 can be adjusted via idler tensioner 13. The spring force supplied to the post feeder 11, in combination with the force of the idler bearing 46, serves to remove any space into which the fiber may otherwise have been able to yield. The post feeder 11 serves to support the metal fiber as it is fed into the guide tube 4 and onto the polymer structures, thereby preventing jams and improving reliability and feed rates. The post feeder 11 mates with guide tube 4, which further supports the fiber en route to the hot block 1.

Figure 19:
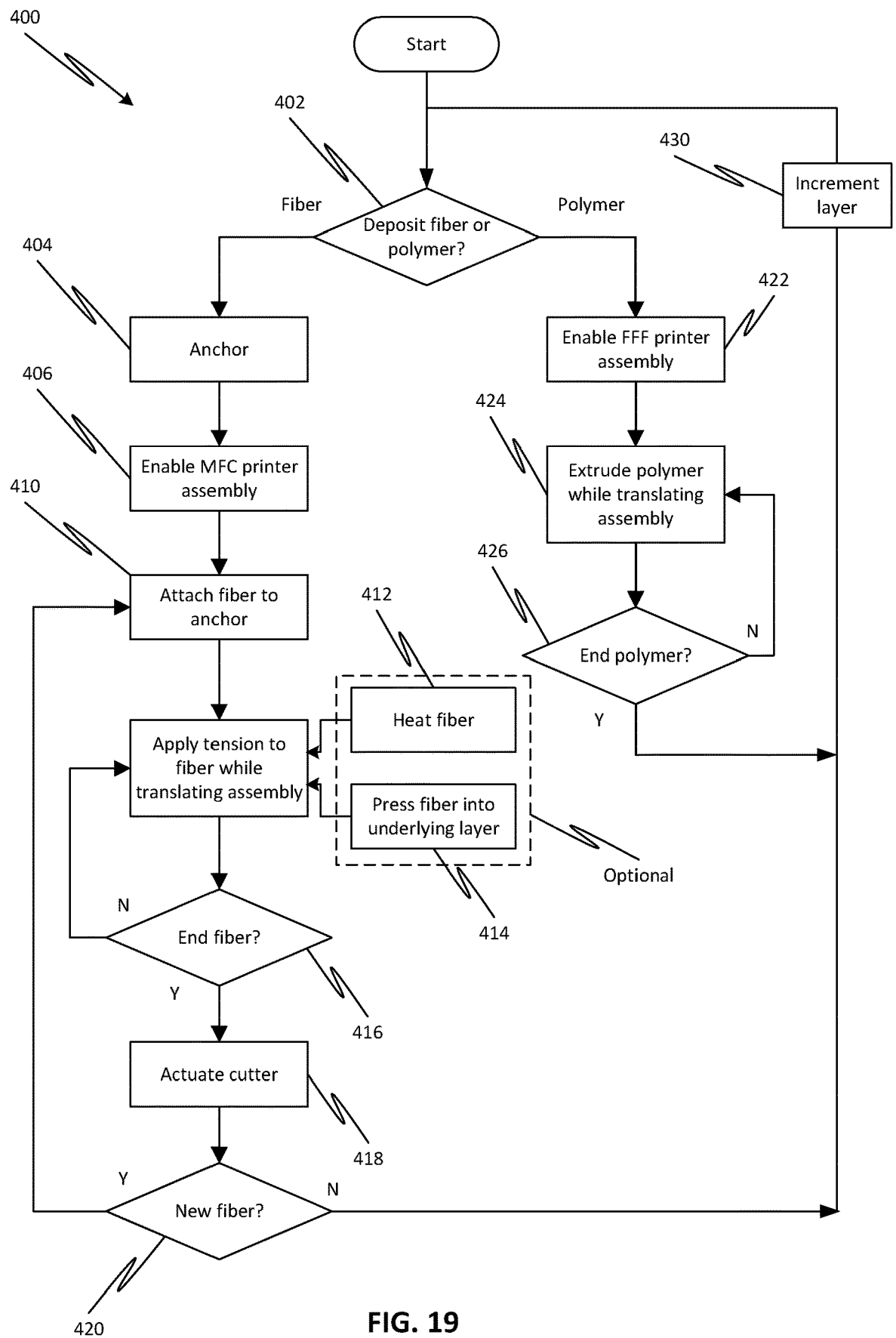
FIG. 19 is a simplified process flow diagram for forming composite structures using an FFF-MFC fabrication technique, according to one or more embodiments of the disclosed subject matter.

As noted above, the FFF printer assembly 40 and MFC printer assembly 30 may be employed to build composite structures (including polymer structures with continuous metal fibers embedded therein). FIG. 19 illustrates a generalized process flow 400 for forming such composite structures. At 402, it is determined whether to proceed with polymer deposition (e.g., using FFF printer assembly 40) or with embedding of metal fibers (e.g., using MFC printer assembly 30). In general, for a particular print layer, the polymer would be deposited first, with metals fibers subsequently embedded into the deposited polymer structures. However, embodiments are not limited thereto.

If polymer deposition is desired, the process proceeds to 422 where the FFF printer assembly is enabled. For example, when the FFF printer assembly and the MFC printer assembly are supported on the same print head, enabling can include selecting a control protocol that positions the nozzle of the FFF printer assembly with respect to desired deposition locations.

Alternatively, when the FFF printer assembly and the MFC printer assembly are supported on separate print heads, enabling can include energizing the print head that supports the FFF printer assembly (although in some embodiments, both print heads may be energized and moving simultaneously). The enabling can also include heating of various elements in the FFF printer assembly necessary to perform the extrusion of polymer.

Proceeding to 424, polymer filament is fed to the FFF printer assembly and is extruded (e.g., through a nozzle or multiple nozzles) to deposit on the print bed or an underlying print layer. As the polymer is extruded by the FFF printer assembly, the print head may be translated to deposit polymer at various locations on the print bed or underlying print layer to form a 2-D network of polymer structures in the current build layer. The process may repeat via 426 until the desired 2-D network is completed. Once polymer deposition is complete at 426 and metal fiber embedding is not desired, the process may increment the build layer (e.g., by incrementing a height of the print bed or by incrementing a height of the print head) before returning to 402.

If metal fiber embedding is desired in the current build layer, the process returns to 402 and proceeds to 404, where an anchor structure for the metal fiber deposition is provided. As noted above, the anchor structure may take the form of a sacrificial polymer structure (e.g., formed by extrusion of polymer via the FFF printer assembly), a portion of the current polymer build layer, or a mechanical anchor.

The process proceeds to 406 where the MFC printer assembly is enabled. For example, when the FFF printer assembly and the MFC printer assembly are supported on the same print head, enabling can include selecting a control protocol that positions the outlet of the MFC printer assembly with respect to desired embedding locations. Alternatively, when the FFF printer assembly and the MFC printer assembly are supported on separate print heads, enabling can include energizing the print head that supports the MFC printer assembly (although in some embodiments, both print heads may be energized and moving simultaneously). The enabling can also include heating of various elements in the MFC printer assembly (e.g., hot block) for heating of the metal fiber.

Proceeding to 408, an initial portion (e.g., 1-5 cm) of the metal fiber from the MFC printer assembly is anchored to the anchor structure. In configurations using a polymer anchor, the metal fiber can be embedded into the anchor structure, for example, by heating the metal fiber to a temperature that melts the polymer and applying pressure to the metal fiber. However, since the metal fiber is not yet anchored, the fiber deposition would not necessarily be applied under tension (in contrast to 410). In configurations using a mechanical anchor that does not require embedding of the metal fiber (e.g., a mechanical clamp), a shorter initial portion (e.g., <1 cm) may be sufficient to anchor the metal fiber.

Once the metal fiber is anchored, the process proceeds to 410 where the MFC printer assembly dispenses fiber while translating, thereby laying fiber over desired locations to form a 2-D pattern of the continuous metal fiber in the current build layer. Since one end of the metal fiber is anchored, the MFC printer assembly can apply a tension force to the metal fiber as it is laid on the current build layer, which tension force may allow the metal fiber to span regions lacking underlying polymer structures without sagging. Of course, embodiments are not limited to applying tension to the metal fiber during deposition. Indeed, in some configurations, the metal fiber may be subject to compression or not subject to any axial force during deposition.

During the deposition of 410, the metal fiber may be heated at 412 and/or may be subject to pressing at 414. In general, when the metal fiber is being embedded into an underlying polymer layer, the metal fiber will be both heated (e.g., preheated by the guide tube and/or heated by the hot block of the MFC printer assembly) and subject to pressing (e.g., by the embedding surface of the MFC printer assembly). However, in some cases, heating or pressing may not be necessary, for example, where the metal fiber is spanning a region without an underlying polymer layer (see, for example, FIGS. 18A-18C).

Deposition of fiber at 410 may continue at 416 until the 2-D continuous pattern in the current build layer is completed, after which the process proceeds to 418 where the continuous fiber is severed (e.g., via the cutting mechanism illustrated in FIG. 10). As noted above, the cutting of the fiber may occur prior to the outlet of the hot block (e.g., within the hot block or between the hot block and the fiber feed system). In such case, the deposition process 410 (and associated heating 412 and/or pressing 414 steps) may continue for a time after the cutting at 416 to allow the cut end of the fiber to be embedded into the current build layer.

The process then proceeds to 420 where it is determined if additional metal fibers are desired in the current build layer. If so, the process returns to repeat steps 408-418. Once metal fiber deposition is complete at 420, the process may return to 402 for formation of further structures on the current build layer. If no further structures are desired, the process may increment the build layer (e.g., by incrementing a height of the print bed or by incrementing a height of the print head), prior to advancing to 402. The process can thus continue until the desired three-dimensional composite structure is formed.

Although steps of process 400 are illustrated as sequential and separate, this is for illustration purposes only. Indeed, in embodiments, steps may occur in different order than otherwise shown (e.g., anchoring prior to enabling the MFC printer assembly) or at a same time as each other (e.g., when fiber embedding occurs simultaneous with polymer extrusion via separate independent print heads). Moreover, the illustration of process 400 is not comprehensive, and other steps that are not illustrated may also form a part of the disclosed FFF-MFC AM method.

In contrast to structures formed by conventional FFF AM methods, which structures may suffer from low mechanical strength or low thermal/electrical conductivity, composite structures formed using the disclosed FFF-MFC AM method are provided with high-strength metal fibers that provide the polymer structure with structural reinforcement and/or thermal/electrical conductivity. In the disclosed FFF-MFC AM method, fiber placement is fully controlled throughout the deposition process (e.g., via translation of the print head), allowing for greater control over the amount and location of reinforcement when compared to filled polymer composite technologies. Various types of composite structures can be formed by the FFF-MFC AM method, such as, but not limited to, heat exchangers, wire harnesses, sensors and electrical circuits in polymers, and structurally reinforced polymer components, such as wings or propellers for aerial vehicles. Other applications of the disclosed method will be readily apparent to one of ordinary skill in the art.

Figure 13:
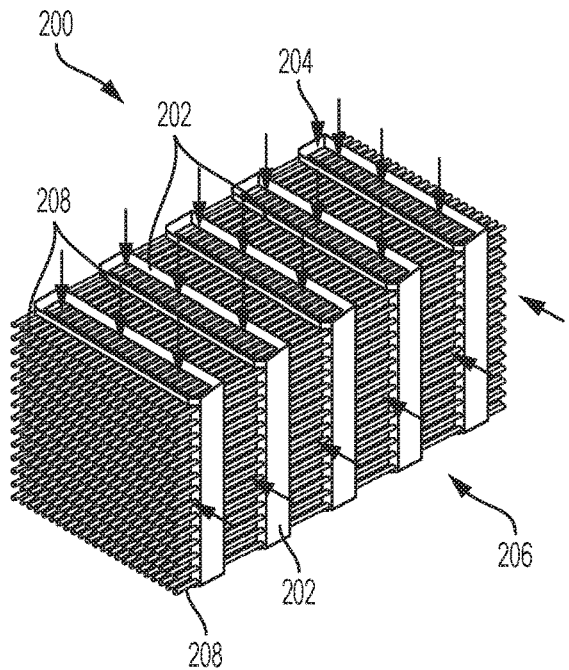
FIG. 13 shows a heat exchanger formed using an MFC printing method, according to one or more embodiments of the disclosed subject matter.

The use of the FFF-MFC AM method can allow the formation of composite structures that would otherwise be difficult or impossible to replicate using conventional fabrication techniques. For example, FIG. 13 illustrates an exemplary heat exchanger 200 (e.g., a cross-media heat exchanger) formed using the disclosed FFF-MFC AM method, where high-conductivity metal fibers 208 extend directly through a low-conductivity material. This allows the majority of the structure to be formed from low conductivity polymers, while the high-conductivity metal fibers act as heat transfer surfaces to improve thermal conductivity. This results in a low cost and lightweight heat exchanger that offers advantages such as increased heat load/mass, lower cost, decreased volume, decreased manual assembly, and increased corrosion and erosion resistance.

In particular, the polymer structures can be formed as tubes 202 defining a first volume 204 for flow of a first working fluid (e.g., hot water) or other media. Regions between adjacent polymer tubes 202 can define a second volume 206 for flow of a second working fluid (e.g., cooling air) or other media. Since the polymer material may generally have a high thermal resistance, the polymer tube would otherwise thermally separate the first volume 204 from the second volume 206. The provision of the metal fibers 208 spanning the volumes 204, 206 and through the walls of the polymer tubes 202 shortens the thermal conduction path between the working fluids and decreases the overall thermal resistance of the heat exchanger 200. Moreover, the thermal performance of the device can be defined independent of the thickness of the walls of the fluid channels, thereby allowing very robust structures (e.g., thicker polymer walls) to be produced without affecting performance or drastically increasing the mass of the heat exchanger.

In embodiments, the polymer tubes 202 of the heat exchanger can be formed of acrylonitrile butadiene styrene (ABS) while the metal fibers 208 can be formed of aluminum or copper. As noted above, the polymer structures are formed via an FFF printer assembly, where a polymer filament is heated past its melting point and deposited onto the structure as a liquid that solidifies. This polymer deposition method allows the polymer to be formed into a wide range of geometries. In the case of heat exchanger 200, the polymer forms fluid channels and any other desired auxiliary structures. Within certain build layers of the polymer structures, the metal fibers 208 are embedded using an MFC print assembly, which allows deposition of the metal fibers without reforming, thereby enabling a variety of fin geometries to be formed. However, since the metal fibers are not reformed during the MFC printing, they cannot otherwise be employed as a main structure (e.g., fluid tube) of the heat exchanger, although they can provide support or structural reinforcement to the base polymer material. Alternatively or additionally, the heat exchanger may be formed using the metal fibers as the main structure, in which case, a post-fabrication surface treatment may optionally coat the metal fibers to seal the fluid volumes from each other.

The metal fibers 208 can be bare metal (i.e., having an external surface that is metal and that is exposed to the working fluid in the respective volume 204, 206) or encased in a coating (e.g., a non-polymer coating such as chrome, ceramic, or metal oxide, or a polymer coating that has a melting temperature greater than that of the polymer build layer forming tubes 202). The metal fibers 208 extend from the area of high temperature fluid/media (e.g., volume 204) to low temperature fluid/media (e.g., volume 206) to thermally link the two heat exchanging fluids. In other words, the metal fibers 208 extend in the heat flow direction in at least one of heat exchanging fluids.

Figure 14:
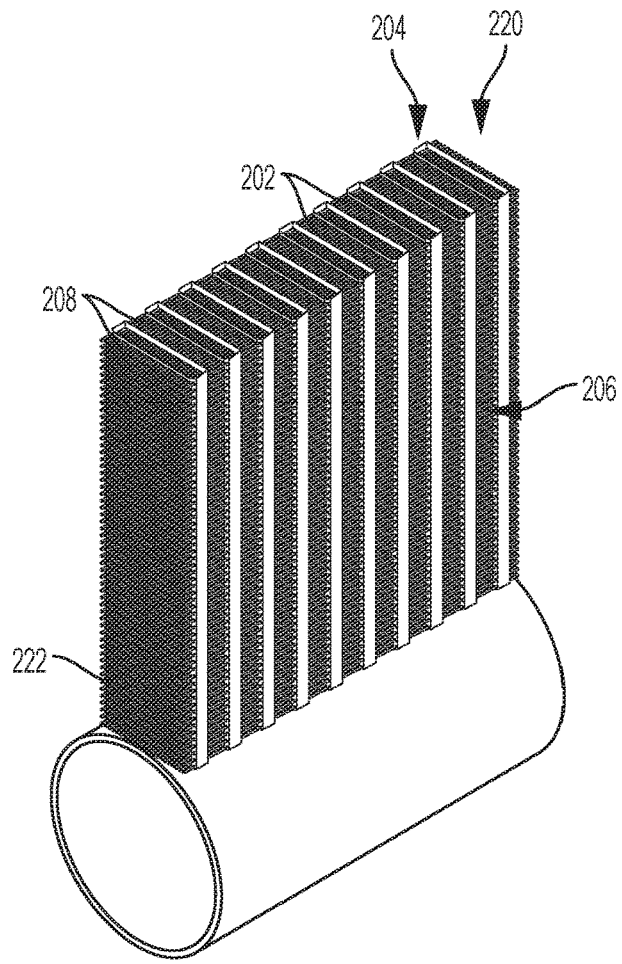
FIG. 14 shows an MFC-fabricated heat exchanger with fluid manifold, according to one or more embodiments of the disclosed subject matter.

In embodiments, the heat exchanger 200 can be configured as a water-air cross-flow heat exchanger, where hot water flows through tubes 202 and cooling air flows through volume 206 between tubes in a direction perpendicular to the water flow direction. For example, input water can be provided via a main supply line or manifold 222 (see FIG. 14) to the individual polymer tubes 202, which water is then cooled by air flowing through volumes 206. Other configurations are also possible according to one or more contemplated embodiments. For example, the regions between tubes 202 could be defined as separate fluid conveyances extending parallel to tubes 202, such that the first fluid in volume 204 and the second fluid in volume 206 flow along parallel directions (either in the same direction or in opposite directions). Flow directions other than those listed above are also possible according to one or more contemplate embodiments. Moreover, embodiments of the disclosed heat exchanger can also be formed in gas-gas, liquid-liquid, gas-liquid, gas-solid, or liquid-solid configurations.

Figure 15:
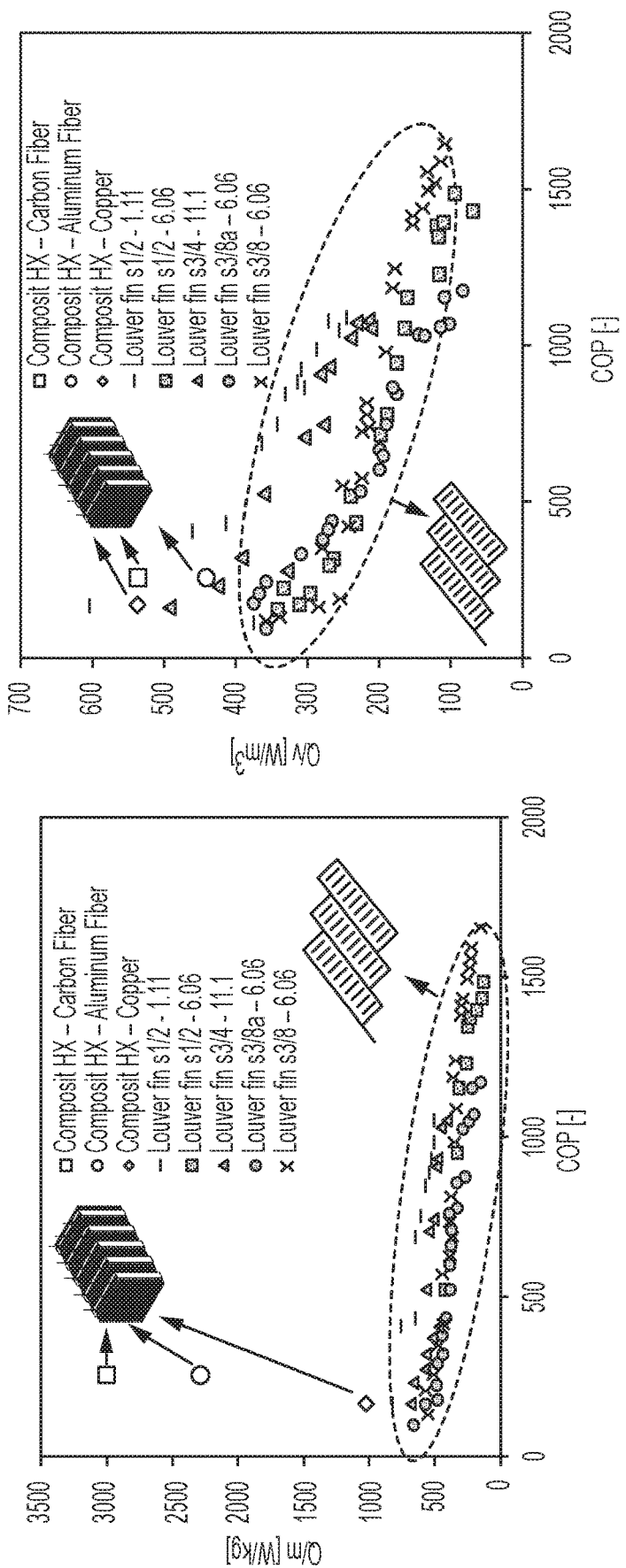
FIG. 15 are graphs comparing performance of an exemplary MFC-fabricated heat exchanger to louvered-fin heat exchangers for diverse cooling applications.

In an example, a heat exchanger was fabricated using the disclosed FFF-MFC AM method for a feasibility assessment for power plant cooling systems (e.g., as the second loop cooling of a power plant). The resulting composite heat exchanger was then compared with a louvered fin heat exchanger under equivalent operating conditions. As illustrated by the graphs of FIG. 15, the composite heat exchanger has the potential to increase heat flow rate per mass of heat exchanger, while reducing (or at least matching) the size of the heat exchanger system. The correlations used to determine the performance of the composite heat exchanger have been validated by prototypes that indicate that these performance gains can be obtained when a full-scale unit (e.g., 12 MW) is produced. Since the cost of the heat exchanger is heavily based on the amount of material required for production, the composite heat exchanger may enjoy significantly lower fabrication costs as well. Moreover, the FFF-MFC Am method may further reduce fabrication costs by minimizing (or at least reducing) the amount of human labor involved.

Although particular materials have been defined above, embodiments of the disclosed subject matter are not limited thereto. Indeed, other polymers can be used, such as, but not limited to, polyethylene terephthalate (PETG), polycarbonate, polystyrene, acrylonitrile styrene acrylate (ASA), and polysulfone (PSU), or combinations thereof. Moreover, other metal fibers can also be used, such as, but not limited to, copper, titanium, steel, and nickel. The heat exchanger capacity noted above is also exemplary, as other capacities can be achieved by appropriate sizing and design. Indeed, heat exchangers having capacities ranging from 150 kW to 1 kW have been produced, and heat exchangers having other capacities can be readily produced.

Figures 16, 17:
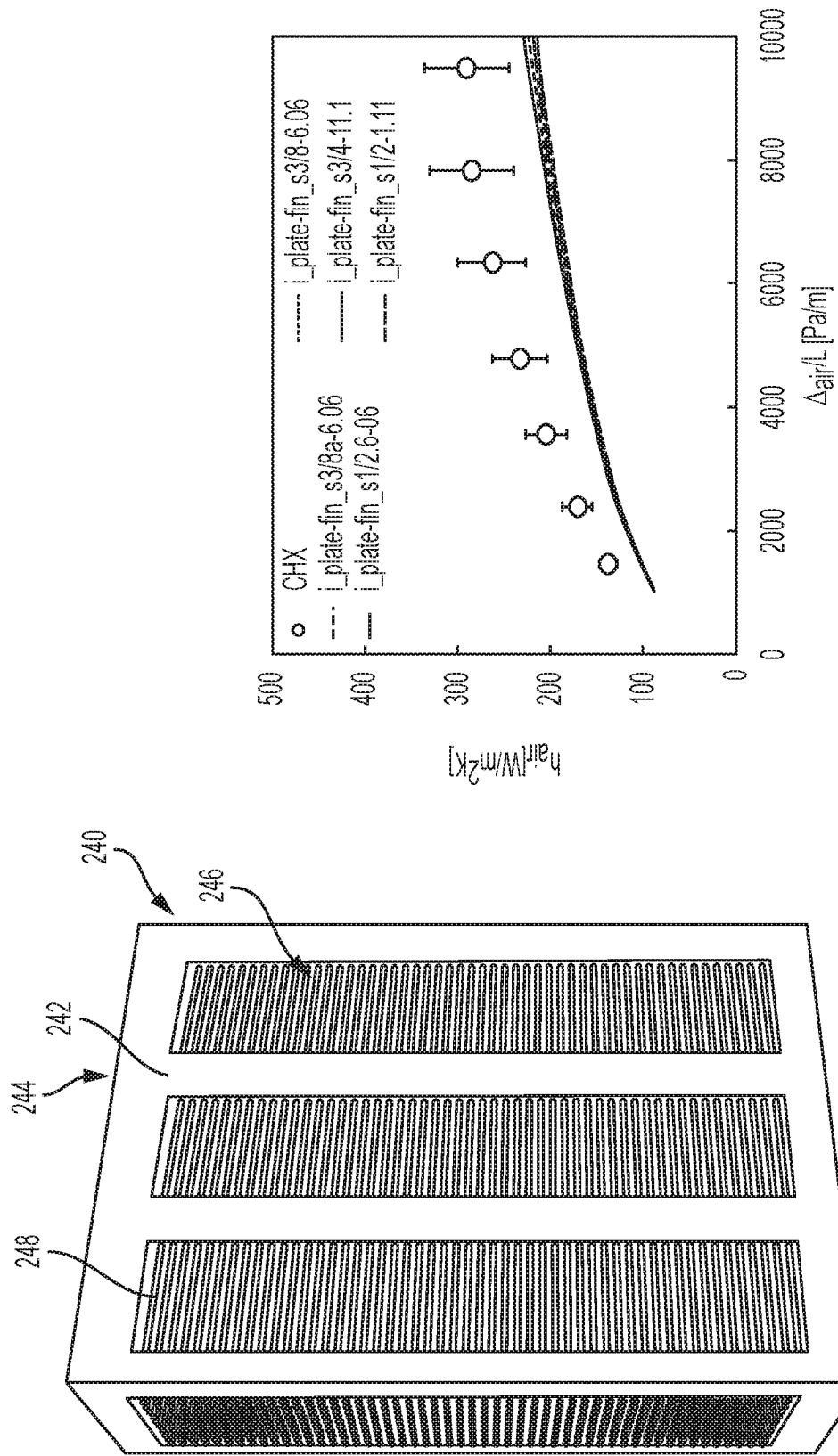
FIG. 16 shows another MFC-fabricated heat exchanger, according to one or more embodiments of the disclosed subject matter.
FIG. 17 is a graph comparing performance of the MFC-fabricated heat exchanger of FIG. 16 to louvered-fin heat exchangers for diverse cooling applications.

For example, FIG. 16 shows another MFC-fabricated heat exchanger 240 where the polymer walls are formed of PETG and the metal fibers 248 are aluminum. As with the previously described heat exchanger, the PETG tubes 242 define a first volume 244 separated from a second volume 246, but thermally connected by metal fibers 248 (in this case, coated metal fibers) extending therethrough. Heat exchanger 240 can be configured as a 177 W liquid-gas heat exchanger. After fabrication by an FFF-MFC AM machine, the heat exchanger 240 was subjected to a sealing treatment (e.g., vacuum infiltration of a thermoset epoxy) to remove any voids in the polymer tubes and/or between the polymer tubes and the metal fibers, such that fluid from the first volume 244 cannot traverse the polymer wall into the second volume 246 and vice versa. In particular, heat exchanger 240 was post processed with an epoxy acetone solution, which hermetically sealed the unit to a pressure containment level of 28 psig.

Performance results for the heat exchanger 240 are listed in Table 1. Moreover, the air-side heat transfer coefficient of the heat exchanger 240 is compared to the heat transfer coefficient of various louvered fin heat exchangers in FIG. 17. As illustrated in FIG. 17, the air-side heat transfer coefficient versus the pressure drop per unit length of the composite heat exchanger is better than that of louvered fin heat exchangers by roughly 30% (at the design point).

TABLE 1

Performance Results of Polymer Composite Heat Exchanger

| Metric | Experiment | Target |
|---|---|---|
| Q [W] | 177 | 150-200 |
| COP [—] | 192 | 100 |
| ε [—] | 0.52 | 0.6 |
| $\Delta T_{water}$ [C] | 1.42 | >1 |
| $h_{air}$ [W/m$^2$K] | 218 | 150-200 |
| $\dot{m}_{air}$ [g/s] | 16.5 | 12-16 |
| $\dot{m}_{water}$ [g/s] | 30 | <48 |

TABLE 1-continued

Performance Results of Polymer Composite Heat Exchanger

| Metric | Experiment | Target |
|---|---|---|
| m [g] | 73.0 | N/A |
| Q/m [W/kg] | 2425 | N/A |
| $p_{max}$ [psi] | 30 | 28 |

Figure 21:
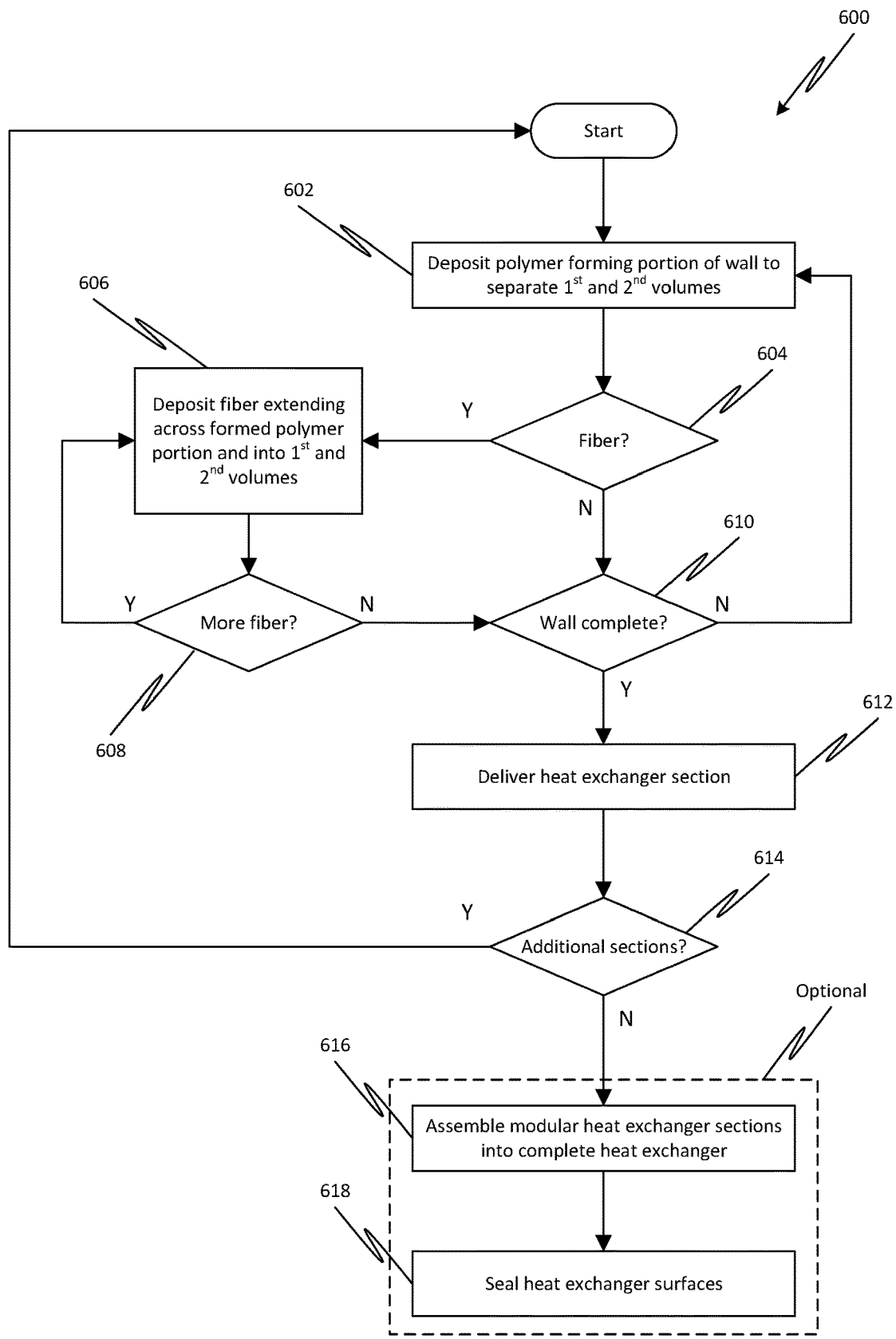
FIG. 21 is a simplified process flow diagram for forming a heat exchanger using the FFF-MFC fabrication technique, according to one or more embodiments of the disclosed subject matter.

Heat exchangers can be fabricated as a complete unit with the desired thermal capacity using the disclosed FFF-MFC AM method. Alternatively or additionally, heat exchanger subunits can be formed and then assembled together into a final heat exchanger with the desired capacity. For example, FIG. 21 illustrates a heat exchanger fabrication method 600 employing MFC techniques for forming composite structures. At 602, a polymer is deposited using an FFF printing assembly to form wall portions in the current build layer. The polymer wall will eventually separate the first and second volumes form each other. Alternatively or additionally, the deposited polymer can form other structural portions in the build layer, such as manifolds or mounting points.

After deposition of the polymer, it is determined at 604 whether metal fibers are desired in the current build layer. Indeed, in some build layers, no metal fibers are embedded, in which case the process proceeds to 610, where the building layer can be incremented and additional portions of the wall or other structures of the heat exchanger can be formed by returning to 602. If metal fibers are desired at 604, the process proceeds to 606, where an MFC printing assembly embeds the fibers in an upper surface of the polymer structures and extending into the first and second volumes. The FFF and MFC deposition methods can be as described above with respect to FIG. 19. If additional fibers are desired in the current build layer at 608, the process can repeat at 606. In some embodiments, multiple fibers can be deposited using the MFC printing assembly (for example, see FIGS. 22-29), in which case, all fibers in a particular build layer may be deposited in a single pass. Once all fibers have been deposited, the process proceeds to 610, where it is determined if the structures forming the heat exchanger are completed. If so, the process proceeds to 612 where the completed heat exchanger is delivered from the AM machine.

Figure 20A:
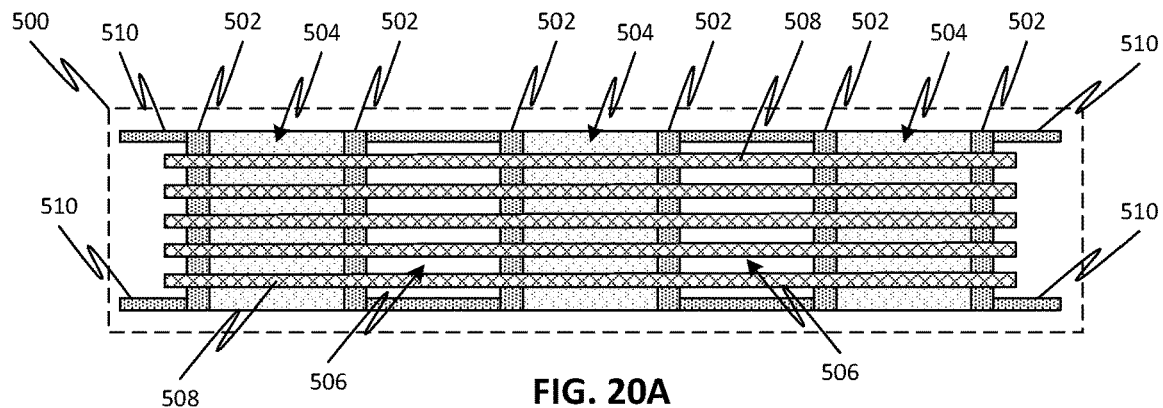
FIG. 20A illustrates an MFC-fabricated heat exchanger as a modular unit, according to one or more embodiments of the disclosed subject matter.
Figure 20B:
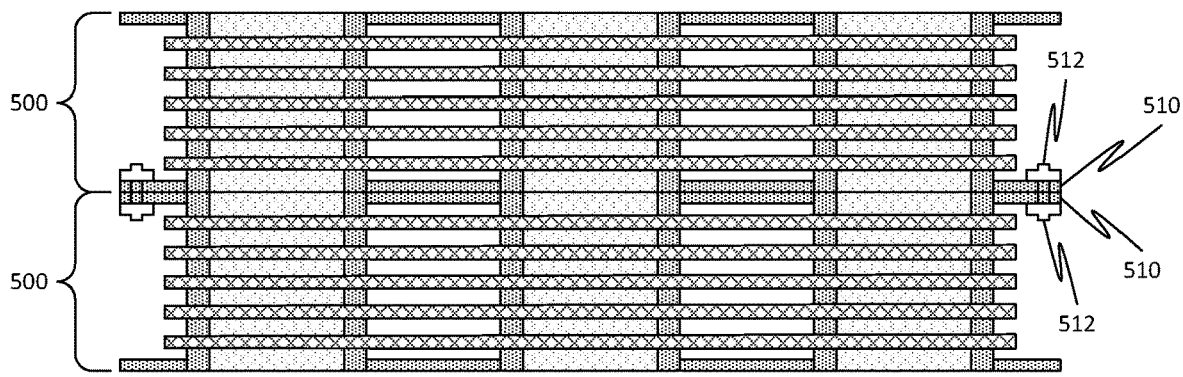
FIGS. 20B-20C illustrate multiple heat exchanger modular units of FIG. 20A coupled together to form larger structures, according to one or more embodiments of the disclosed subject matter.
Figure 20C:
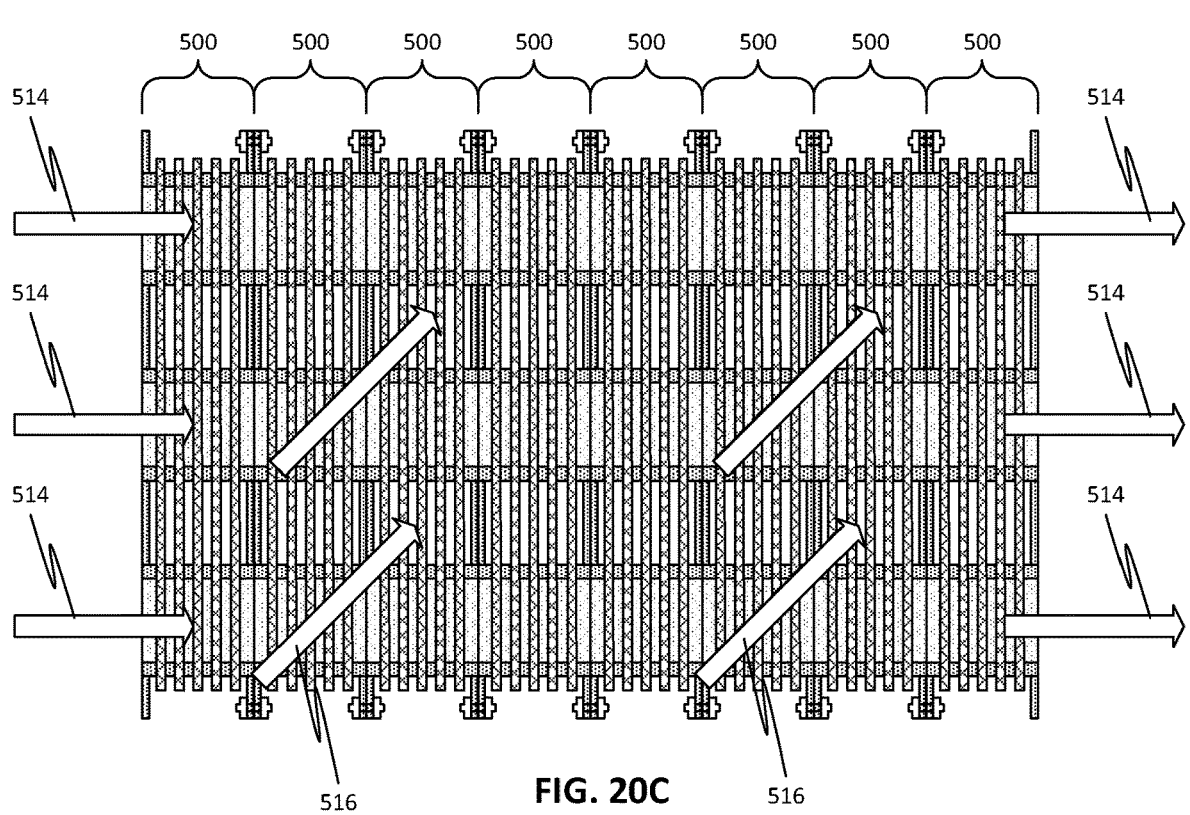

In some embodiments, the heat exchanger may be a modular section, such as subunit 500 in FIG. 20A. As with the previously discussed heat exchangers, subunit 500 includes polymer tubes 502 defining a first volume 504 for a first fluid flow 514, with a second fluid flow 516 through a second volume 506 between adjacent polymer tubes 502. Multiple metal fibers 508 extend through walls of the polymer tubes 502 to thermally connect the first and second volumes 504, 506. In addition, the subunit 500 can include a mounting portion 510 that allows multiple subunits 500 to be coupled together by a coupling mechanism (e.g., via bolts 512 or by gluing or bonding together mating surfaces of the subunits 500) to form larger heat exchangers. For example, a heat exchanger with two subunits is shown in FIG. 20B, while a heat exchanger with eight subunits is shown in FIG. 20C. The number of subunits illustrated in FIGS. 20B-20C is exemplary only, and other numbers or configurations of subunits is also possible according to one or more contemplated embodiments.

Returning to FIG. 21, in configurations where the formed heat exchanger resulting after 612 comprises a modular subunit (as in FIGS. 20A-20C), the process can continue to

614. If additional heat exchanger sections (e.g., subunits) are desired, the FFF-MFC AM process can be repeated by returning to 602. Once all desired heat exchanger sections have been formed, the sections can optionally be assembled into a larger heat exchanger at 616.

The resulting assembly of heat exchanger subunits (or when only a single heat exchanger is desired, the heat exchanger resulting from 612) can optionally be subjected to post processing at 618. The post processing can involve the removal of any auxiliary structures, such as supports or anchors. The post processing can also include subjecting the heat exchanger to a surface treatment, for example, by heat treating or chemically processing to remove any defects in the device (i.e., removing any voids that may exist in the polymer walls or between the polymer and the embedded metal fibers). The surface treatment may also serve to coat the metal fibers in polymers, for example to isolate the metal fibers from the working fluids and thus prevent (or at least reduce) corrosion.

For example, when the polymer forming the heat exchanger comprises ABS, the heat exchanger can be exposed to a solution of ABS-laden acetone as the surface treatment. The acetone mixture partially melts/dissolves the polymer structure while also simultaneously depositing ABS onto the metal fibers and into any voids formed during the AM process. The ABS-laden acetone can be formed by adding an amount of ABS (e.g., between 0.05 g/ml and 0.4 g/ml, inclusive) to an acetone solution and then mixing until the ABS polymer is fully dissolved/suspended. To avoid water contamination, the polymer can be dried prior to addition to the acetone. Further stabilizing additives can be added to the solution to enhance coating or other properties.

Concentrations of the polymer within the solution can be varied according to the desired characteristics of the final composite structure. For example, higher concentrations can lead to greater thickness of the coating of the polymer structures and/or metal fibers. The resulting structure is hermetically sealed and free of defects and structural deficiencies. Moreover, the surface treatment allows repair of any defects without undermining the integrity of the polymer structures. Thus, the heat exchanger after the surface treatment has substantially the same or greater weight than just prior to the surface treatment.

Other surface treatments can be applied depending on the composition of the composite structure. For example, where the polymer structures are formed of a first polymer material (e.g., an amorphous polymer), the surface treatment may generally include a solvent (e.g., an organic solvent) with the first polymer dissolved or suspended therein. The solvent can be selected based on its ability to dissolve the first polymer. For example, the solvent can be acetone or dichloromethane.

The FFF-MFC AM technique is not limited to the construction of heat exchangers. Indeed, the disclosed systems and methods can be used to construct a variety of composite structures with different configurations. For example, polymer components can be formed with embedded electronic circuits. The metal fibers deposited according to the MFC technique are electrically conductive and can be embedded into the polymer structures in a way that replicates standard circuitry. This can permit construction of polymer parts that contain wiring to enable many electronic applications, such as, but not limited to, operating sensors or low power actuators. For example, polymer quadcopter arms could be constructed to contain much of its wiring within the arms. Since the metal fibers will be contained by overlying polymer structures, the metal fibers can be isolated from each other as well as the environment. Such features can potentially eliminate (or at least reduce) the need for bulky wiring harnesses and may simplify the final assembly of the device.

Figure 18C:
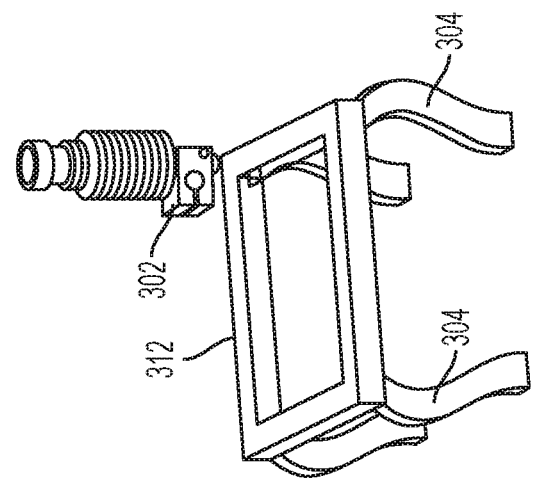
FIGS. 18A-18C illustrate gap-spanning aspects of the FFF-MFC fabrication techniques, according to one or more embodiments of the disclosed subject matter.
Figure 18B:
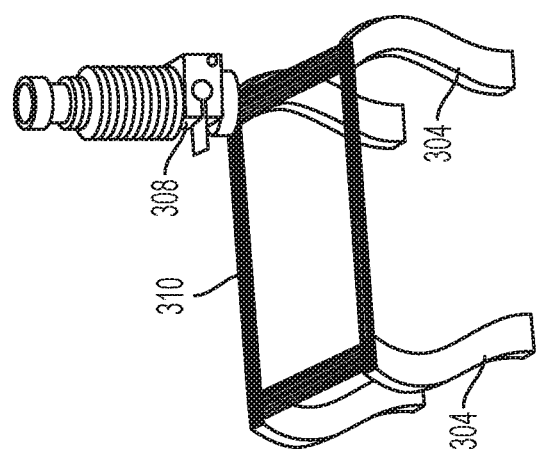
Figure 18A:
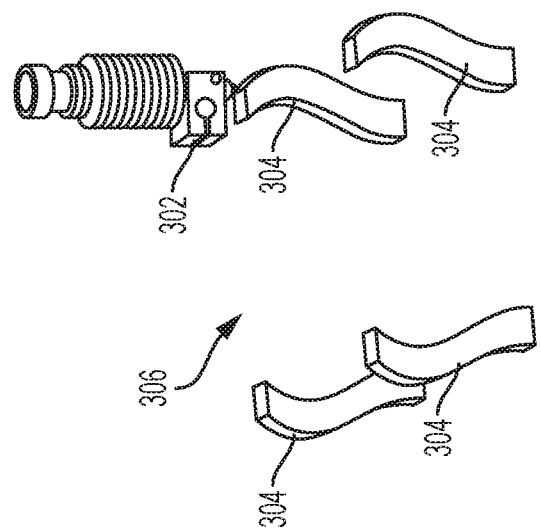

As illustrated above with respect to the heat exchanger configurations, the FFF-MFC fabrication techniques allow metal fibers to span across gaps (i.e., the first and second volumes) between polymer structures. The depositing of the fibers under tension allows the fibers to extend between polymer structures without substantial sagging, for example, over distances from 20 mm up to or exceeding 40 mm. Metal fibers bridging the gap between polymer structures can then be printed over without reliance on other support structures. For example, FIGS. 18A-18C illustrates aspects of an FFF-MFC AM method employing this bridging technique. In FIG. 18A, an FFF printing assembly 302 is used to form one or more polymer structures 304 with gaps 306 therebetween. In FIG. 18B, metal fibers 310 can be embedded into the polymer structures 304 and strung over gaps 306 via MFC printing assembly 308. The metal fibers can form a netting, which can then be printed over by FFF printing assembly 302, thereby forming a bridge 312 over the previously empty space, as shown in FIG. 18C.

In embodiments, the embedded metal fibers can also act as structural reinforcement similar to how rebar is used to form reinforced concrete structures. The bond between the fibers and polymer is strong enough that any load will be effectively pass to the fiber when the structure undergoes strain. The resulting composite structure can have load bearing capabilities greater than a structure built with the polymer alone. Other applications and advantages of the disclosed FFF-MFC AM techniques and resulting composite structures are also possible according to one or more contemplated embodiments and will be readily apparent to one of ordinary skill in the art.

Figure 22A:
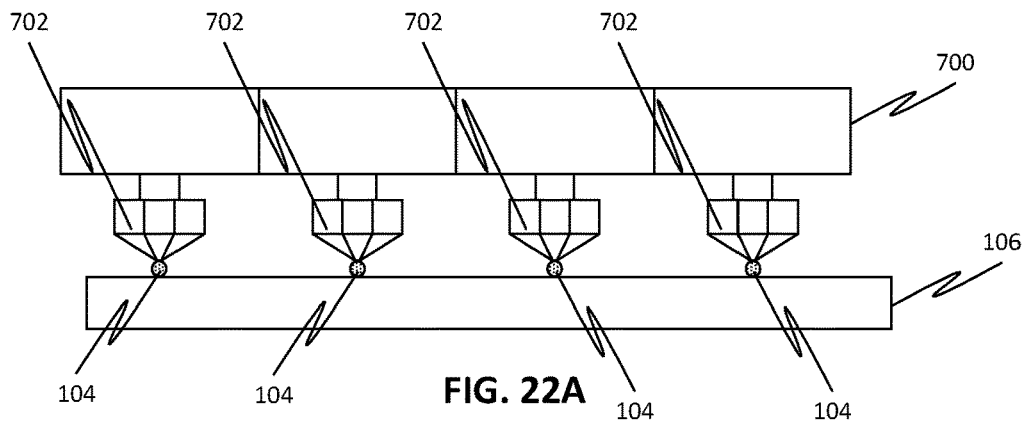
FIGS. 22A-22D are simplified diagrams illustrating a variation for polymer and metal fiber deposition by FFF and MFC printer assemblies, according to one or more embodiments of the disclosed subject matter.
Figure 22B:
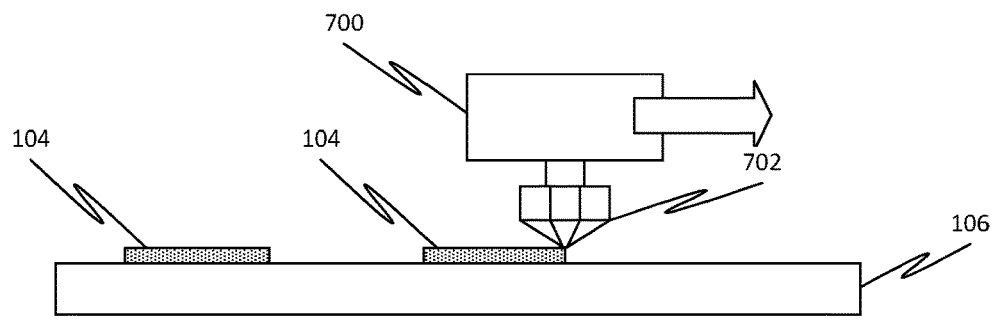

As noted above, embodiments of the FFF-MFC AM method can allow multiple metal fibers to be embedded at the same time. Such embodiments may be especially useful for composite structures where the fibers are disposed in an array in a similar arrangement within and/or between layers, such as the heat exchanger of FIG. 13. FIGS. 22A-22D illustrate another exemplary process flow for forming a polymer composite with multiple simultaneous depositions. An FFF printer assembly 700 is provided with multiple nozzles 702 for extruding polymer 104 to form polymer structures. For example, as shown in FIGS. 22A-22B, the FFF printer assembly 700 can first deposit multiple polymer structures onto print bed 106, which may be movable in one dimension (e.g., perpendicular to the motion of the print head 700, in order to increment between layers) or in multiple dimensions.

Again, the extrusion aspects of the FFF printer assembly 700 may be in conventional manner, for example, by taking polymer feed stock in the form of filament, using an extruder to melt the polymer filament, and then ejecting the melted polymer via the outlets of one or more nozzles of the array to form structures on the print bed 106. Alternatively or additionally, the FFF printer assembly may include a single deposition nozzle, as in FIGS. 1A-1E, and deposit polymer portions in a sequential manner.

Figure 22C:
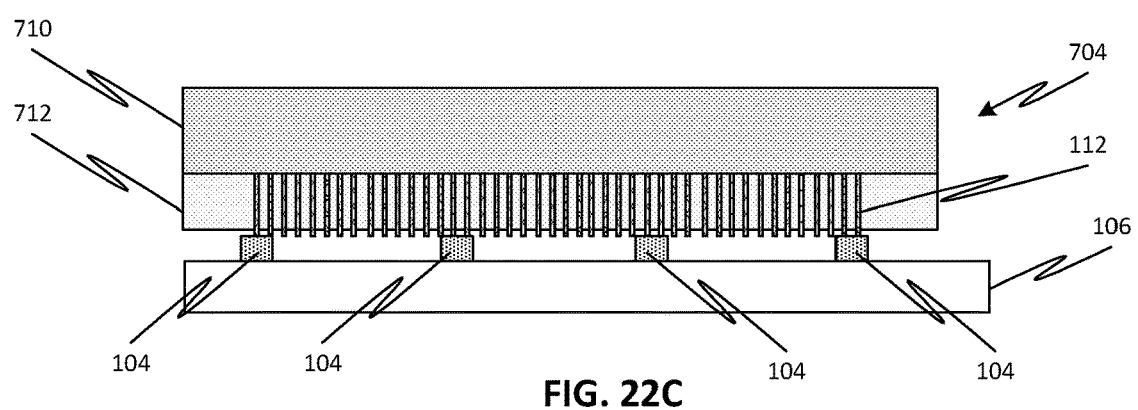
Figure 22D:
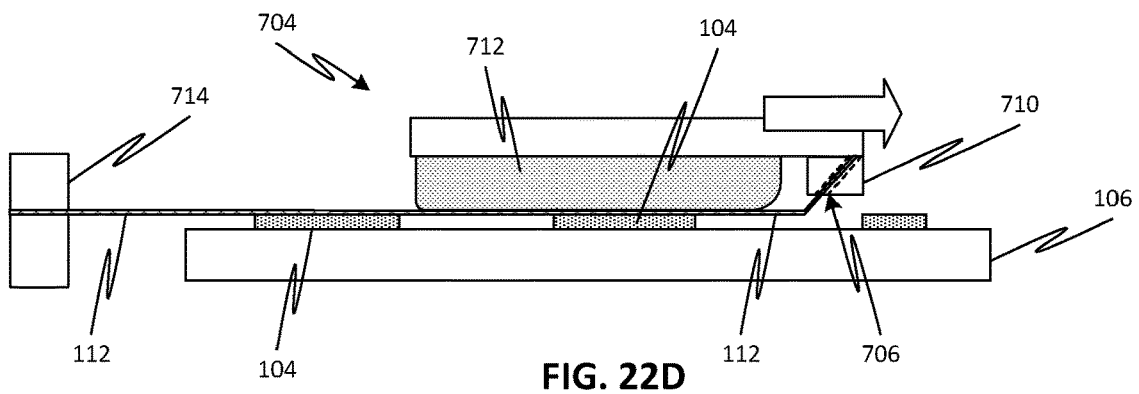

After deposition of the polymer structures 104 forming a build layer, the MFC printer assembly 704 can then proceed to embed an array of continuous metal fibers into an upper surface of the polymer structures 104, as shown in FIG. 22C-22D. For example, the MFC printer assembly 704 can include a fiber feed head 710 with feed channel 706, through which the metal fibers are fed from the supply to a deposition region. Note that although the feed channel 706 is shown as angled in FIG. 22D, the feed channel 706 may have other orientations, such as perpendicular to the surface of the print bed 106. Alternatively or additionally, the MFC printer assembly can include multiple feeding ports, e.g., by disposing multiple printer assemblies 108 in an array, such that multiple fibers can be deposited simultaneously via a single print head.

The feed head can include geometric features that allow the array of metal fibers 112 to smoothly transition to a direction roughly parallel to the print bed 106, for example, by having a curved or chamfered trailing edge. A pressure plate 712 can be disposed adjacent to the feed head 710 and can press the deposited fibers 112 into the underlying polymer structures 104. The fiber 112 can be heated, for example, by feed head 710 and/or by pressure plate 712, such that the polymer around the fiber 112 melts, thereby allowing the fiber 112 to be embedded therein. Leading and/or trailing edges of the pressure plate 712 may also be supplied with geometric features that allow the surface to smoothly translate over protruding portions of the underlying polymer structures 104. For example, the edges of the pressure plate 712 can be curved (i.e., have a radius) or chamfered.

To begin the embedding, an initial portion of the continuous metal fiber 112 is secured by a mechanical anchor 714, for example, a clamp. The MFC assembly 704 thus advances the metal fiber 112 from channel 706 under tension, thereby allowing the fiber 112 to span regions between structures 104 where no polymer is formed. At the end of embedding fibers 112, a cutting mechanism (not shown) may sever the continuous fiber proximal to the feed head 710, for example, between the feed head 710 and the pressure plate 712. Deposition of a new array of fibers 112 can then be initiated on the same build layer or deposition of a new polymer layer can be initiated. FIGS. 22A-22D can thus be repeated to build up a complex composite structure.

Although the direction of motion of FFF print assembly 700 in FIG. 22B is shown as the same as that of MFC print assembly 704 in FIG. 22D, this is for illustration purposes only. Other directions are also possible according to one or more contemplated embodiments. Indeed, the ultimate direction and movements of the respective print assemblies will depend on the desired composite structure design. Moreover, although the FFF print assembly 700 is shown separate (and independently positionable) from the MFC print assembly 704, embodiments of the disclosed subject matter are not limited thereto. For example, each assembly can be supported on a common cross beam or positioning system. In such a configuration, only one of the FFF assembly 700 or the MFC assembly 704 may operate at a given time, or both may operate simultaneously.

Figure 28:
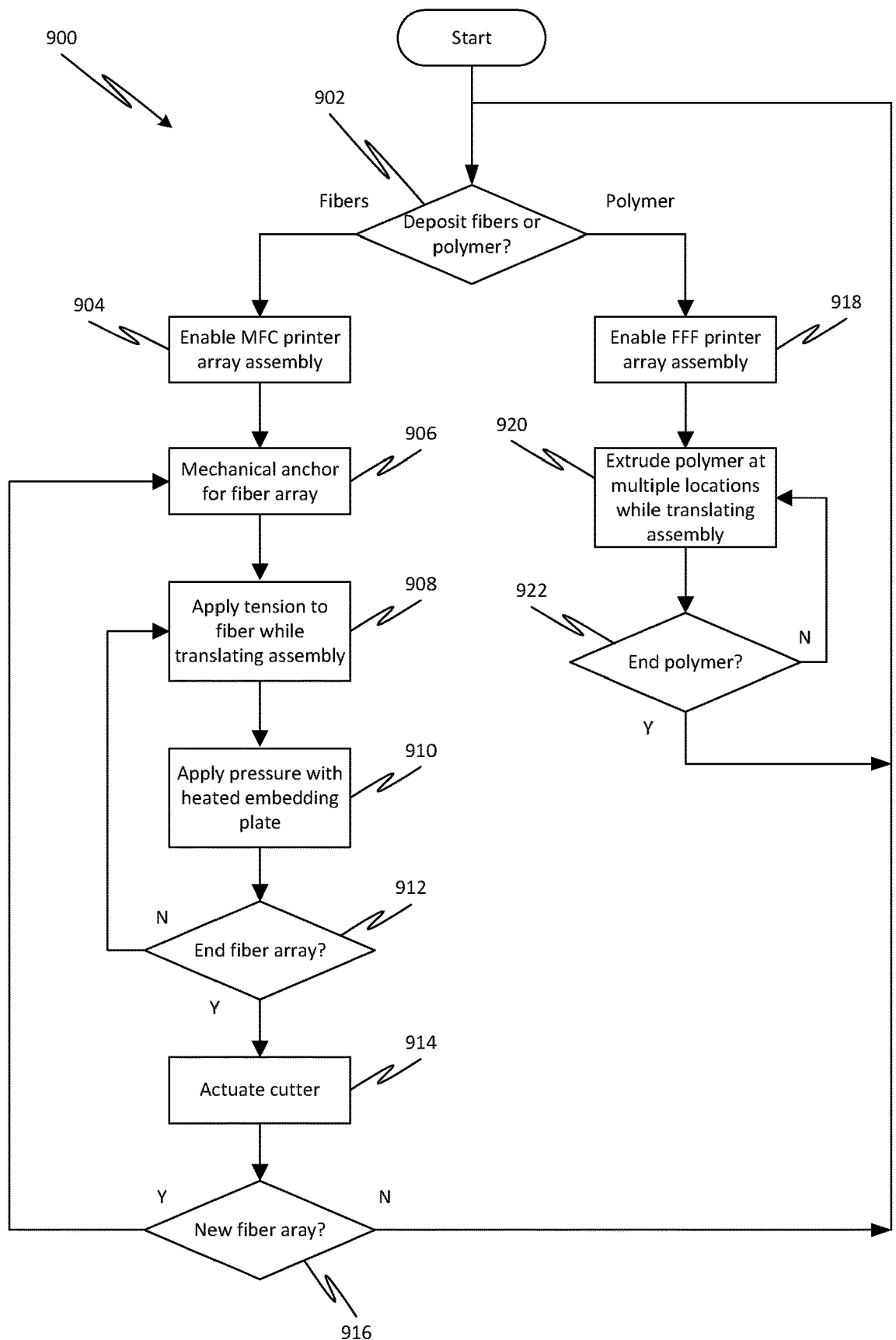
FIG. 28 is a simplified process flow diagram for array deposition using the FFF-MFC fabrication technique, according to one or more embodiments of the disclosed subject matter.

Referring to FIG. 28, a generalized process flow 900 for forming composite structures using an arrayed fiber deposition approach is shown. At 902, it is determined whether deposition should proceed with polymer deposition (e.g., using FFF printer assembly 700 or FFF printer assembly 102) or with embedding of an array of metal fibers (e.g., using MFC printer assembly 704). In general, for a particular print layer, the polymer would be deposited first, with metals fibers subsequently embedded into the deposited polymer structures. However, embodiments are not limited thereto.

If polymer deposition is desired, the process proceeds to 918 where the FFF printer assembly is enabled. For example, when the FFF printer assembly and the MFC printer assembly are supported on the same print head, enabling can include selecting a control protocol that positions the nozzle of the FFF printer assembly with respect to desired deposition locations. Alternatively, when the FFF printer assembly and the MFC printer assembly are supported on separate print heads, enabling can include energizing the print head that supports the FFF printer assembly (although in some embodiments, both print heads may be energized and moving simultaneously). The enabling can also include heating of various elements in the FFF printer assembly necessary to perform the extrusion of polymer.

Proceeding to 920, polymer filament is fed to the FFF printer assembly and is extruded (e.g., through a nozzle for sequential deposition of polymer, as in FIGS. 1A-1E, or an array of nozzles for simultaneous deposition of polymer, as in FIG. 22A) to deposit on the print bed or an underlying print layer. As the polymer is extruded by the FFF printer assembly, the print head may be translated to deposit polymer at various locations on the print bed or underlying print layer to form a 2-D network of polymer structures in the current build layer. The process may repeat via 922 until the desired 2-D network is completed. Once polymer deposition is complete at 922 and metal fiber embedding is not desired, the process may increment the build layer (e.g., by incrementing a height of the print bed or by incrementing a height of the print head) and return to 902.

If metal fiber embedding is desired in the current build layer, the process returns to 902 and proceeds to 904, where the MFC printer assembly is enabled. For example, when the FFF printer assembly and the MFC printer assembly are supported on the same print head, enabling can include selecting a control protocol that positions the outlet of the MFC printer assembly with respect to desired embedding locations. Alternatively, when the FFF printer assembly and the MFC printer assembly are supported on separate print heads, enabling can include energizing the print head that supports the MFC printer assembly (although in some embodiments, both print heads may be energized and moving simultaneously). The enabling can also include heating of various elements in the MFC printer assembly (e.g., fiber feed head 710 and/or pressure plate 712) for heating of the array of metal fibers.

Proceeding to 406, an initial portion of each metal fiber in the array is secured by a mechanical anchor, which may be, for example, a clamping mechanism. Of course, other anchoring configurations are also possible according to one or more contemplated embodiments. For example, a sacrificial polymer structure or a portion of the underlying polymer structure can be used, as discussed elsewhere herein. Once the array of metal fibers is anchored, the process proceeds to 908 where the MFC printer assembly dispenses fibers while translating, thereby laying fibers over desired locations to form a 2-D pattern of continuous metal fibers in the current build layer.

Since one end of each metal fiber is anchored, the MFC printer assembly can apply a tension force to each metal fiber as it is laid on the current build layer, which tension force may allow the metal fibers to span regions lacking underlying polymer structures without sagging. Of course, embodiments are not limited to applying tension to the metal fiber during deposition. Indeed, in some configurations, the metal fiber may be subject to compression or not subject to any axial force during deposition.

During the deposition of 908, the metal fibers may be heated and/or subject to pressing at 910, for example, by a pressure plate that trails the fiber feed head. In general, when the metal fiber is being embedded into an underlying polymer layer, the metal fiber will be both heated (e.g., preheated by fiber feed system and/or heated by the pressure plate of the MFC printer assembly) and subject to pressing (e.g., by the pressure plate of the MFC printer assembly). However, in some cases, heating or pressing may not be necessary, for example, where the metal fiber is spanning a region without an underlying polymer layer (see, for example, FIGS. 18A-18C).

Deposition of fibers at 908 may continue at 912 until the 2-D continuous pattern in the current build layer is completed, after which the process proceeds to 914 where the continuous fibers are severed (e.g., via a cutting mechanism disposed between the pressure plate and the fiber feed head). The process then proceeds to 916 where it is determined if additional metal fibers are desired in the current build layer. If so, the process repeats steps 906-914. Once metal fiber deposition is complete at 916, the process may return to 902 for formation of further structures on the current build layer. If no further structures are desired, the process may increment the build layer (e.g., by incrementing a height of the print bed or by incrementing a height of the print head), prior to advancing to 902. The process can thus continue until the desired three-dimensional composite structure is formed.

Although steps of process 900 are illustrated as sequential and separate, this is for illustration purposes only. Indeed, in embodiments, steps may occur in different order than otherwise shown (e.g., anchoring prior to enabling the MFC printer assembly) or at a same time as each other (e.g., when fiber embedding occurs simultaneous with polymer extrusion via one or more separate independent print heads). Moreover, the illustration of process 900 is not comprehensive, and other steps that are not illustrated may also form a part of the disclosed FFF-MFC AM method.

Figure 29A:
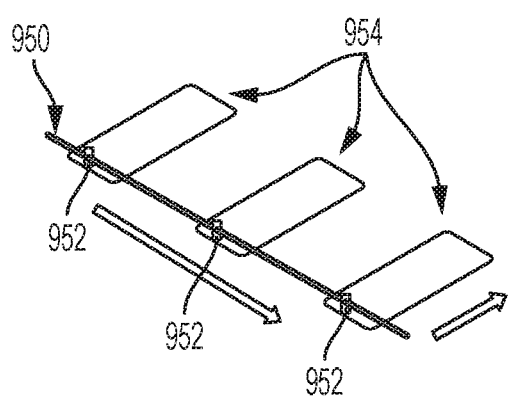
FIGS. 29A-29D are simplified diagrams illustrating a variation for fabrication of a heat exchanger using FFF and MFC printer assemblies, according to one or more embodiments of the disclosed subject matter.
Figure 29B:
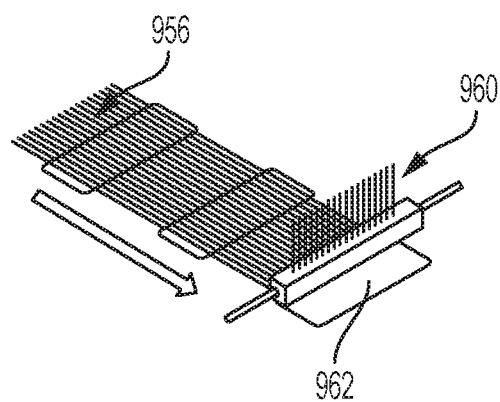
Figure 29C:
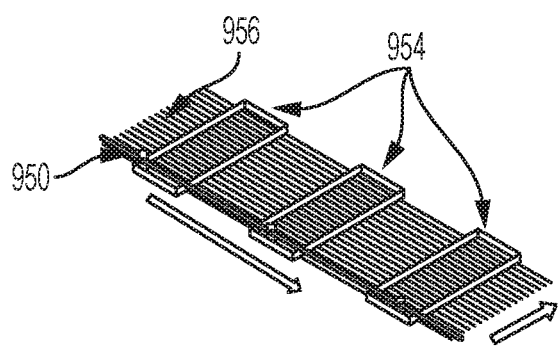
Figure 29D:
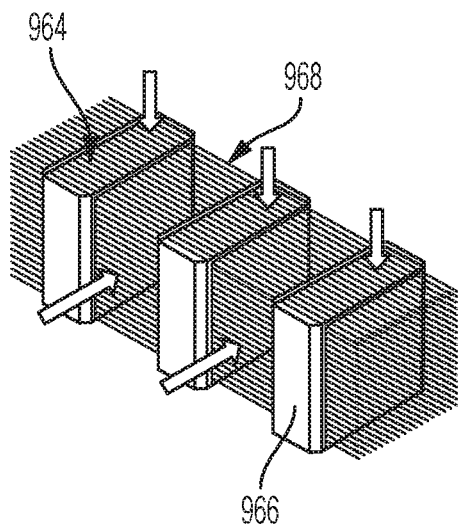

The process 900 can be used to efficiently form the heat exchanger structures illustrated in FIG. 13. For example, as shown in FIG. 29A, the polymer extrusion step 920 includes simultaneously forming 2-D polymer patterns 954 using an array of polymer extrusion nozzles 952 supported on an FFF printing assembly 950. At a particular build layer, a fiber feed head 958 and pressure plate 962 of MFC printing assembly 960 are used to embed an array of metal fibers 956, as shown in FIG. 29B (corresponding to processes 908-910). Subsequent 2-D polymer patterns 954 can be formed in additional build layers atop the previously formed build layers and array of metal fibers 956, as shown in FIG. 29C. FIGS. 29A-29C can be repeated to form the final heat exchanger structure, with polymer walls 966 separating first volumes 964 from second volumes 968, as shown in FIG. 29D.

Figure 23:
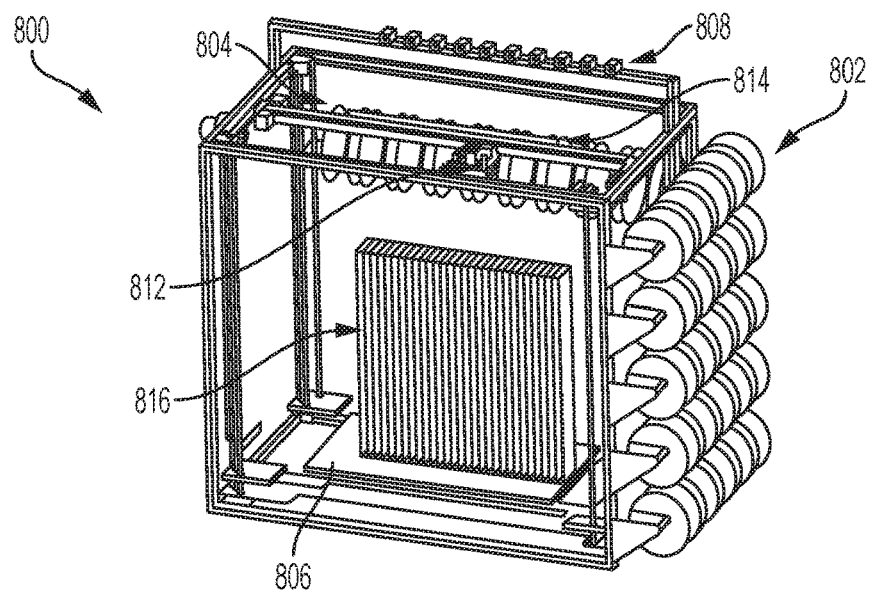
FIG. 23 illustrates another AM system including FFF and MFC printer assemblies, according to one or more embodiments of the disclosed subject matter.
Figure 24:
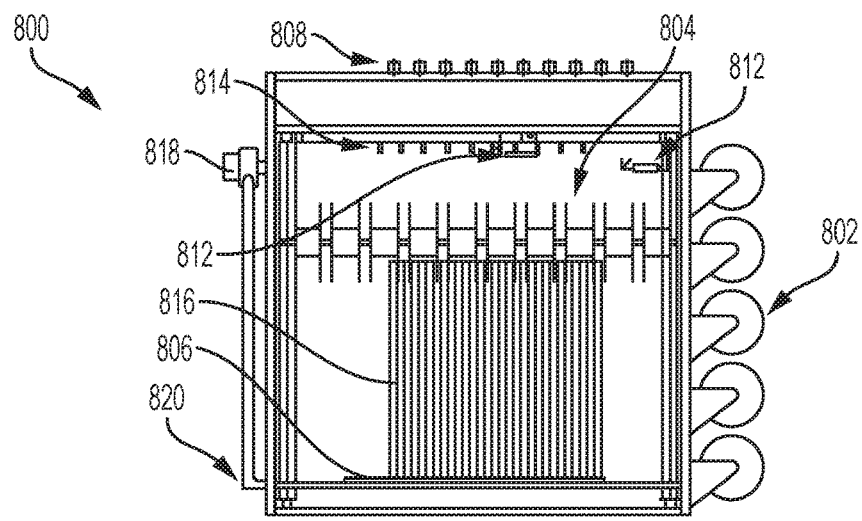
FIGS. 24 and 25 are side and top views, respectively, of the AM system of FIG. 23.
Figure 25:
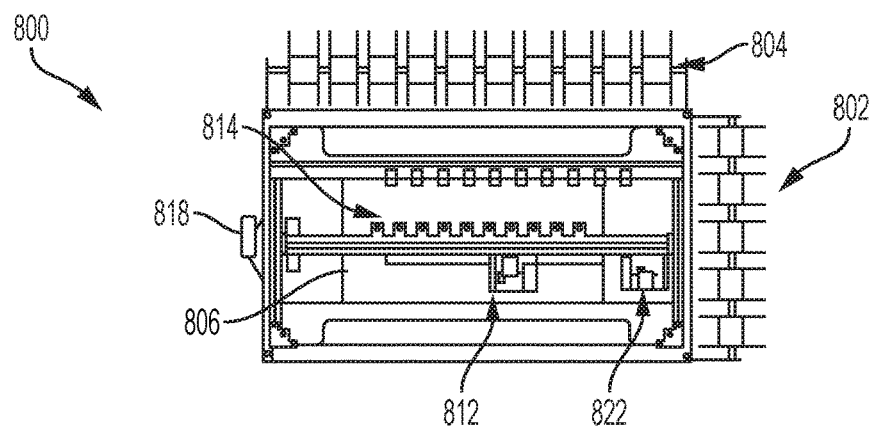
Figure 26:
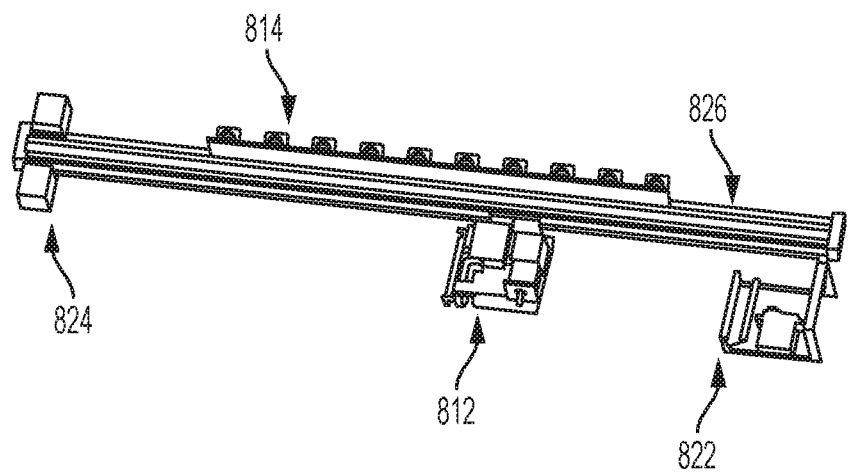
FIG. 26 is a close-up top view of the FFF and MFC printer assemblies of the AM system of FIG. 23.
Figure 27A:
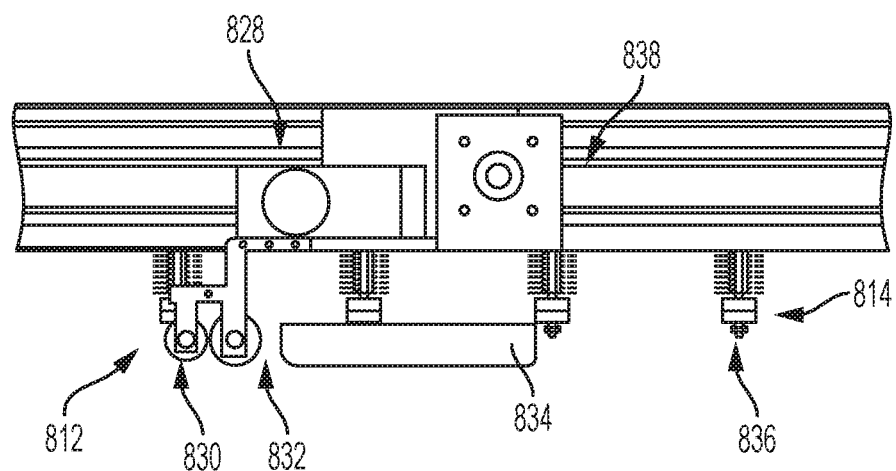
FIG. 27A is a close-up side view of the MFC printer assembly of FIG. 26.
Figure 27B:
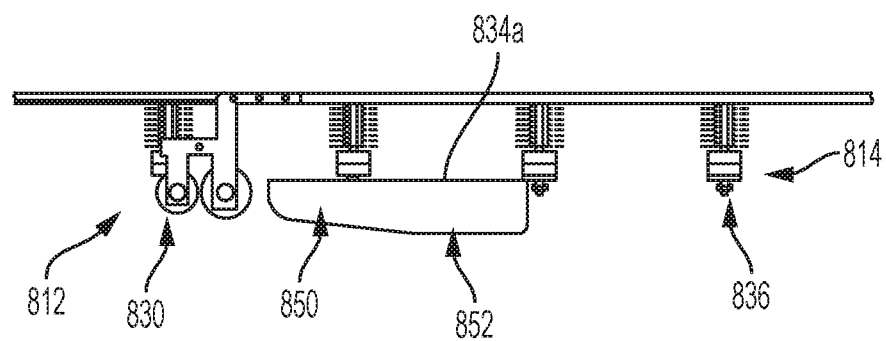
FIG. 27B is a close-up side view of an MFC printer assembly with an alternative pressure plate, according to one or more embodiments of the disclosed subject matter.

An exemplary AM system 800 for carrying out the fabrication methods of FIGS. 28-29 is illustrated in FIGS. 23-27A. In particular, FIG. 23 provides a perspective view of the overall AM system 800, while FIGS. 24-25 provide side and top down views of the AM system 800 of FIG. 23. FIG. 26 provides a top perspective view of the print head, in particular, the FFF printing assembly 814 and the MFC printing assembly 812, while FIG. 27A provides a close-up side view focusing on the MFC printing assembly 812 of FIG. 26.

The AM system 800 can include a first supply rack of metal fiber spools 802 for use by the MFC printing assembly 812, and a second supply rack of polymer filament spool 804 for use by the FFF printing assembly. As with the other disclosed embodiments, the FFF printing assembly can extrude the polymer filament, e.g., via polymer extruders 808 and nozzles 836, to produce polymer structures 816 on a print bed 806. The FFF printing assembly can be configured to deposit multiple polymer structures at the same time, for example, by providing an array of extruders 808 and/or a corresponding array 814 of nozzles 836. The AM system 800 can further be provided with an air circulator 818 and/or a vent/heater 820, which components may be used to control the environment for the polymer structure 816 during or after formation thereof.

As with other disclosed embodiments, the MFC printing assembly 812 can embed metal fibers into one or more of the build layers of the polymer structures 816, e.g., via fiber feed system 830 and pressure plate 834. The MFC printing assembly can be configured to embed multiple metal fibers at the same time, for example, by anchoring an array of fibers via mechanical clamp 822 and simultaneously feeding the array onto the build layer via feed system 830 and stepper motor 838, after which pressure plate 834 pushes the fiber array into the polymer of the underlying build layer. The pressure plate 834 can also heat the fiber array such that the polymer of the underlying build layer melts, thereby allowing the fiber array to become embedded therein.

In certain embodiments, the array of metal fibers can be preheated prior to reaching the build layer, for example, by one or more components of the feed system 830. For example, one of the drive gears of the feed system 830 can partially preheat the fiber array. Alternatively or additionally, a pressure plate 834a (FIG. 27B) can have an angled leading surface 850, which serves to preheat the metal fiber array before it contacts the polymer of the underlying build layer. Once sufficiently heated, the metal fiber array is then pushed into the polymer by trailing surface 852, causing the polymer to melt and the fiber array to become embedded therein.

Once embedding of the fiber array is complete, a cutting mechanism (not shown) can be used to sever the fibers. For example, the cutting mechanism can be disposed at location 832, between the feed system 830 and the pressure plate 834, as illustrated in FIG. 27A. An actuator 838, for example, a servo motor, can be provided adjacent to the MFC printing assembly 812 to actuate the cutting mechanism.

Although the array 814 of nozzles 836 of the FFF printing assembly and the MFC printing assembly 812 are illustrated as being supported on a common support rail (in particular, on opposite sides of the support rail) and thus being moved together by displacement device 824 (e.g., stepper motor), embodiments of the disclosed subject matter are not limited thereto. Indeed, the FFF printing assembly and the MFC printing assembly could be formed on different support rails and capable of independent positioning, for example, to allow simultaneous deposition on a particular build layer, or to allow one of the printing assemblies to undergo a priming procedure while the other printing assembly is actively forming a portion of the build layer. Moreover, additional support rails can be provided, for example, to include supplemental FFF and/or MFC printing assemblies to form non-repeating structures, to repair structures that were not formed properly by the primary FFF or MFC printing assemblies, to reinforce or stitch together repeating structures, or for any other purpose.

Although a specific heat exchanger design has been fabricated using the disclosed FFF-MFC AM techniques, this is only one example of the type of composite structure that can be formed. Indeed, a wide variety of thermal management devices and other composite structures can be formed using the disclosed techniques. Accordingly, embodiments of the disclosed subject matter are not limited to the specific heat exchanger designs illustrated and discussed herein.

Although embodiments disclosed herein have focused on final structures that are composite polymer structures with embedded metal fibers, the disclosed techniques are not limited thereto. Indeed, the disclosed techniques can be used to form other types of final structures, such as all polymer structures (e.g., where one polymer has a higher melting temperature than the other), non-metal polymer composite structures (e.g., where the continuous fiber is formed by a material other than metal, such as glass), and all metal structures. For example, a heat exchanger may be formed where the walls separating the fluid volumes are metal rather than polymer. This may be accomplished by providing polymer support structures at ends of the metal fibers, such as at inlets/outlets of the fluid volume formed by the metal fiber, at outer ends of the heat exchanger, or at any other location.

Alternatively or additionally, an initial composite structure can be formed as a precursor to a final all metal structure, such as an all metal heat exchanger. For example, using the disclosed FFF-MFC AM techniques, an initial composite structure can be formed with a high percentage of metal particles contained in the polymer feed material (e.g., 80% or greater metal particles on a volume basis). Once the part has been produced through the FFF-MFC production method, this initial composite structure can then be heated to a temperature at or above the sintering temperature of the metal. For example, heating can be accomplished in a furnace, with the initial composite structure supported by a mold (e.g., green sand mold) or unsupported. The heating thus melts or burns off all of the polymer material in the initial composite structure, while sintering the metal particles/fibers together into a metal structure. After cooling, the resulting structure is an all metal structure (e.g., at least 98% solid metal). The all metal structure can then be ready for use or optionally subject to further processing (e.g., by performing a surface treatment to coat one or more surfaces of the metal structure).

In one or more first embodiments, an additive manufacturing (AM) method comprises (a) depositing a layer of polymer structures using a fused filament fabrication (FFF) printer assembly comprising at least one nozzle. The AM method can also comprise (b) using a metal fiber composite (MFC) printer assembly, spaced from the at least one nozzle, to embed a continuous metal fiber into one or more of the polymer structures of said layer. The step of (b) can include (b1) heating the metal fiber to a temperature such that polymer adjacent the metal fiber melts, and applying pressure to the metal fiber using an embedding surface of the MFC printer assembly so as to embed the metal fiber into the one or more polymer structures.

In the first embodiments or any other embodiment, the embedding surface of the MFC printer assembly simultaneously applies heat and pressure to the metal fiber.

In the first embodiments or any other embodiment, the metal fiber is preheated prior to the applying pressure using the embedding surface of the MFC printer assembly.

In the first embodiments or any other embodiment, the FFF printer assembly is part of a first print head supported by a first positioning system, and the MFC printer assembly is part of a second print head supported by a second positioning system, the first and second print heads being positioned independent of each other.

In the first embodiments or any other embodiment, the FFF and MFC printer assemblies are part of a common print head supported by a positioning system. In the first embodiments or any other embodiment, the method can further include, prior to (a), coupling the MFC printer assembly to an existing print head having the FFF printer assembly.

In the first embodiments or any other embodiment, the metal fiber is a bare metal without any polymer coating. In the first embodiments or any other embodiment, the metal fiber comprises aluminum, copper, titanium, steel, nickel, or metal alloy. In the first embodiments or any other embodiment, the metal fiber has a non-polymer coating. In the first embodiments or any other embodiment, the coating comprises at least one of chrome, ceramic, or a metal oxide. In the first embodiments or any other embodiment, the metal fiber comprises a coating having a melting temperature greater that of the polymer structures, and the coating is not melted or removed by the heating and applying pressure of (b1).

In the first embodiments or any other embodiment, the MFC printer assembly includes a hot block and (b) includes prior to or concurrent with (b1), feeding the metal fiber through an outlet of the hot block toward a deposition region. In the first embodiments or any other embodiment, an outer edge of the outlet is curved or chamfered. In the first embodiments or any other embodiment, the metal fiber transitions from being parallel to a first direction prior to the outlet, to being parallel to a second direction after the outlet, the second direction being perpendicular to the first direction.

In the first embodiments or any other embodiment, the hot block includes the embedding surface adjacent to the outlet. In the first embodiments or any other embodiment, the embedding surface is between an edge of the hot block and the outlet in a direction parallel to the embedding surface, said edge being curved or chamfered.

In the first embodiments or any other embodiment, the feeding the metal fiber comprises passing the metal fiber from a fiber feed system to the hot block. In the first embodiments or any other embodiment, the fiber feed system is part of the MFC printer assembly or is separate from the MFC printer assembly. In the first embodiments or any other embodiment, the fiber feed system comprises a drive bolt with a groove along its circumference, and a post feeder that is urged against the drive bolt by a spring and idle bearing so as to press the fiber into the groove. In the first embodiments or any other embodiment, the groove has a depth greater than a radius of the metal fiber. In the first embodiments or any other embodiment, the groove has a depth that is at least 25% greater than the radius of the metal fiber. In the first embodiments or any other embodiment, the fiber feed system is thermally isolated from the hot block. In the first embodiments or any other embodiment, the fiber feed system is thermally isolated from the hot block by a heat break coupled to the hot block and a heat sink between the heat break and the fiber feed system.

In the first embodiments or any other embodiment, a portion of the fiber feed system preheats the metal fiber before the applying pressure of (b1).

In the first embodiments or any other embodiment, the AM method further includes cutting the metal fiber. In the first embodiments or any other embodiment, the hot block supports an actuatable blade to perform the cutting of the metal fiber proximal to the outlet. In the first embodiments or any other embodiment, the metal fiber is cut in a region within the hot block, along a feed path between an inlet and the outlet of the hot block. In the first embodiments or any other embodiment, the metal fiber is cut in a region outside the hot block, or in a region between the hot block and the fiber feed system.

In the first embodiments or any other embodiment, the AM method further includes, prior to (b), anchoring a portion of the continuous metal fiber to an anchor section, a tension being applied to the anchored fiber as it is fed onto the one or more polymer structures. In the first embodiments or any other embodiment, the anchor section is a removable polymer structure outside the layer of polymer structures. In the first embodiments or any other embodiment, the anchor section comprises a portion of the layer of polymer structures, or a mechanical clamp outside the layer of polymer structures.

In the first embodiments or any other embodiment, the embedded fiber spans across at least one open space between adjacent polymer structures. In the first embodiments or any other embodiment, the open space is at least 40 mm.

In the first embodiments or any other embodiment, the embedded fiber provides electrical or thermal conductivity between different regions separated by the polymer structures. In the first embodiments or any other embodiment, the embedded fiber is part of an electrical circuit.

In the first embodiments or any other embodiment, the FFF printer assembly is part of a first print head, and the MFC print assembly is part of a second print head that is separate or independent of the first print head.

In the first embodiments or any other embodiment, the FFF printer assembly includes multiple nozzles for simultaneous polymer deposition.

In the first embodiments or any other embodiment, (b) includes simultaneously embedding multiple continuous metal fibers into one or more of the polymer structures of said layer. In the first embodiments or any other embodiment, the AM method further includes, prior to (b), simultaneously feeding the multiple metal fibers to a deposition region such that the multiple fibers contact an upper surface of the one or more of the polymer structures of said layer. In the first embodiments or any other embodiment, the MFC printer assembly includes a fiber feed system that feeds the metal fibers to the deposition region, and an embedding plate trailing the fiber feed system so as to apply pressure and heat to the metal fibers contacting the upper surface of the one or more of the polymer structures of said layer. In the first embodiments or any other embodiment, the AM method further includes cutting the metal fibers in a region between the embedding plate and the fiber feed system. In the first embodiments or any other embodiment, at least one of a trailing edge and a leading edge of an embedding surface of the embedding plate is curved or chamfered.

In the first embodiments or any other embodiment, the AM method further includes (c) repeating (a) and/or (b) to deposit multiple layers with continuous metal fibers embedded therein to form a composite structure. In the first embodiments or any other embodiment, the composite structure comprises a heat exchanger. In the first embodiments or any other embodiment, the polymer structures form walls of the heat exchanger, the walls defining a first volume separated from a second volume, and the embedded metal fibers extend through at least one of the walls and between the first and second volumes. In the first embodiments or any other embodiment, the polymer structures form multiple conduits extending in a first direction, the conduits having interior volumes for a first fluid flow along the first direction, regions between adjacent polymer conduits defining exterior volumes for a second fluid flow, and the embedded metal fibers extend through walls of the conduits to thermally connect the interior and exterior volumes. In the first embodiments or any other embodiment, the second fluid flow is along a second direction perpendicular to the first direction, is parallel to the first direction, or is at an angle with respect to the first direction. In the first embodiments or any other embodiment, one of the first and second fluids is a liquid, the other of the first and second fluids is a gas, and a temperature of the liquid is different from a temperature of the gas.

In the first embodiments or any other embodiment, the composite structure is a modular subunit, and the AM method further includes (d) repeating (c) to form one or more additional modular subunits, and (e) coupling the modular subunits together to form a custom composite structure. In the first embodiments or any other embodiment, the modular subunit is a heat exchanger subassembly, and the custom composite structure is a custom heat exchanger. In the first embodiments or any other embodiment, the heat exchanger has a capacity ranging from as small as a few W (e.g., 1 W) to as large as several MW (e.g., 10 MW) or larger. In the first embodiments or any other embodiment, a capacity of the heat exchanger can be scaled by adjusting an overall size of the heat exchanger. In the first embodiments or any other embodiment, the heat exchanger has a capacity of at least 1 W or at least 1 MW.

In the first embodiments or any other embodiment, the AM method further includes, after (c), subjecting the composite structure to a surface treatment to seal voids in the polymer structure or between the embedded metal fibers and the polymer structures. In the first embodiments or any other embodiment, the surface treatment also coats exposed portions of the embedded fibers with a polymer. In the first embodiments or any other embodiment, the polymer structures are formed of an acrylonitrile butadiene styrene (ABS) polymer, and the surface treatment comprises exposing the composite structure to an ABS-laden acetone mixture. In the first embodiments or any other embodiment, the polymer structures are formed of a first polymer material, and the surface treatment comprises exposing the composite structure to a solvent with the first polymer material dissolved therein. In the first embodiments or any other embodiment, the first polymer material comprises at least one of acrylonitrile butadiene styrene (ABS), polycarbonate, polystyrene, acrylonitrile styrene acrylate (ASA), and polysulfone (PSU). In the first embodiments or any other embodiment, the first polymer material comprises an amorphous polymer or semi-crystal polymer. In the first embodiments or any other embodiment, the solvent comprises an organic solvent. In the first embodiments or any other embodiment, the solvent comprises acetone or dichloromethane. In the first embodiments or any other embodiment, the surface treatment is such that a weight of the composite structure prior to the surface treatment is the same as or less than that of the composite structure after the surface treatment.

In one or more second embodiments, a heat exchanger is formed by the method according to one or more of the first embodiments.

In the seconds embodiments or any other embodiment, the heat exchanger includes walls formed by the polymer structures and defining a first volume separated from a second volume, wherein the embedded metal fibers extend through at least one of the walls and into the first and second volumes. In the second embodiments or any other embodiment, the embedded metal fibers provide thermal conductivity between the first and second volumes greater than thermal conductivity between the first and second volumes through the walls. In the second embodiments or any other embodiment, the walls are free of any voids.

In the second embodiments or any other embodiment, the heat exchanger includes multiple conduits formed by the polymer structures, extending in a first direction, and having interior volumes for a first fluid flow along the first direction. In the second embodiments or any other embodiment, regions between adjacent conduits define exterior volumes for a second fluid flow, and the embedded metal fibers extend through the conduits in a direction crossing the first direction so as to thermally connect the interior and exterior volumes. In the second embodiments or any other embodiment, walls of the conduits, through which the embedded metal fibers extend, are free of any voids.

In the second embodiments or any other embodiment, the heat exchanger includes a first subunit having polymer structures with embedded metal fibers, and a second subunit having polymer structures with embedded metal fibers. In the second embodiments or any other embodiment, the first and second subunits are separately formed and coupled together to form a single unit.

In one or more third embodiments, a metal heat exchanger is formed by the method according to one or more of the first embodiments.

In the third embodiments or any other embodiment, the heat exchanger includes walls formed by the sintered metal fibers and defining a first volume separated from a second volume. In the third embodiments or any other embodiment, polymer structures supporting the metal fibers prior to sintering can be removed (e.g., melted or burned off) in the sintering of the metal fibers.

In the third embodiments or any other embodiment, the heat exchanger can include metal fibers that extend through at least one of the walls and into the first and second volumes. In the third embodiments or any other embodiment, the embedded metal fibers provide thermal conductivity between the first and second volumes equal to or greater than thermal conductivity between the first and second volumes through the walls. In the third embodiments or any other embodiment, the walls are free of any voids.

In the third embodiments or any other embodiment, the heat exchanger includes multiple conduits formed by the sintered metal fibers, extending in a first direction, and having interior volumes for a first fluid flow along the first direction. In the second embodiments or any other embodiment, regions between adjacent conduits define exterior volumes for a second fluid flow.

In the third embodiments or any other embodiment, the embedded metal fibers extend through the conduits in a direction crossing the first direction so as to thermally connect the interior and exterior volumes. In the third embodiments or any other embodiment, walls of the conduits, through which the embedded metal fibers extend, are free of any voids.

In the third embodiments or any other embodiment, the heat exchanger includes a first subunit having metal structures, and a second subunit having metal structures. In the third embodiments or any other embodiment, the first and second subunits are separately formed and coupled together to form a single unit. In the third embodiments or any other embodiment, the first and second subunits are coupled together before sintering, after sintering, or by sintering together.

In one or more fourth embodiments, a metal fiber composite (MFC) printer assembly is adapted to be supported with a fused filament fabrication (FFF) printer assembly on a common print head of an additive manufacturing (AM) machine. In the fourth embodiments or any other embodiment, the MFC printer assembly includes a hot block with an outlet and an embedding surface. In the fourth embodiments or any other embodiment, the outlet is constructed to feed a continuous metal fiber therethrough, and the embedding surface is adjacent to the outlet and is constructed to apply at least pressure to the metal fiber extending out of the outlet.

In the fourth embodiments or any other embodiment, the embedding surface is constructed to simultaneously apply heat and pressure to the metal fiber extending out of the outlet. In the fourth embodiments or any other embodiment, the embedding surface is between a trailing edge of the hot block and the outlet in a direction parallel to the embedding surface. In the fourth embodiments or any other embodiment, the embedding surface surrounds the outlet in plan view.

In the fourth embodiments or any other embodiment, the MFC printer assembly further includes a pre-heating guide tube that supports and heats the metal fiber prior to the outlet of the hot block.

In the fourth embodiments or any other embodiment, a circumferential or perimeter edge of the hot block outlet is curved or chamfered. In the fourth embodiments or any other embodiment, at least one of a leading edge and a trailing edge of the hot block is curved or chamfered.

In the fourth embodiments or any other embodiment, the MFC printer assembly further includes a fiber feed system spaced from the hot block. In the fourth embodiments or any other embodiment, the fiber feed system is thermally isolated from the hot block. In the fourth embodiments or any other embodiment, the fiber feed system includes a drive bolt with a groove along its circumference, and a post feeder that is urged against the drive bolt by a spring and idle bearing, the groove being constructed to support the continuous metal fiber therein.

In the fourth embodiments or any other embodiment, the MFC printer assembly further includes a heat break coupled to an inlet end of the hot block, a heat sink coupled between the heat break and the fiber feed system, and a guide tube that extends from the fiber feed system to the hot block, through the heat sink and heat break, to support the continuous metal fiber. In the fourth embodiments or any other embodiment, the guide tube is constructed to preheat the metal fiber prior to the outlet of the hot block.

In the fourth embodiments or any other embodiment, the MFC printer assembly further includes a cutting assembly. In the fourth embodiments or any other embodiment, the cutting assembly is supported on the hot block, and includes a blade that moves internally within the hot block to sever the continuous metal fiber.

In the fourth embodiments or any other embodiment, the hot block includes a heating element.

In the fourth embodiments or any other embodiment, the MFC printer assembly further includes a mount plate constructed to hold the MFC printer assembly to a print head with an existing FFF printer assembly.

In one or more fifth embodiments, an additive manufacturing (AM) machine comprises a fused filament fabrication (FFF) printer assembly with at least one nozzle, and the MFC printer assembly of one or more of the fourth embodiments, or any other embodiment.

In the fifth embodiments or any other embodiment, the AM machine includes a print head supporting both the FFF printer assembly and MFC printer assembly. In the fifth embodiments or any other embodiment, the AM machine includes a controller that controls positioning of the print head, operation of the FFF printer assembly to deposit polymer, and MFC printer assembly to feed continuous metal fiber, embed the metal fiber into deposited polymer, and cut the metal fiber.

In the fifth embodiments or any other embodiment, the AM machine includes a first print head supporting the FFF printer assembly and a second print head supporting the MFC printer assembly, the first print head being capable of positioning independent of the second print head.

In one or more sixth embodiments, an additive manufacturing (AM) system comprises a fused filament fabrication (FFF) printer assembly with at least one polymer deposition nozzle, and a metal fiber composite (MFC) printer assembly constructed to simultaneously embed multiple continuous metal fibers into deposited polymer structures. In the sixth embodiments or any other embodiment, the MFC printer assembly includes a fiber feed system that simultaneously feeds the multiple metal fibers to a deposition region, and an embedding plate at a trailing portion of the fiber feed system and constructed to apply at least pressure to the multiple metal fibers fed to the deposition region.

In the sixth embodiments or any other embodiment, a portion of the fiber feed system is constructed to preheat the metal fibers prior to the deposition region. In the sixth embodiments or any other embodiment, the embedding plate is constructed to simultaneously apply heat and pressure to the multiple metal fibers fed to the deposition region.

In the sixth embodiments or any other embodiment, the AM system further includes an anchor that holds initial portions of the multiple metal fibers fed from the fiber feed system. In the sixth embodiments or any other embodiment, the fiber feed system is configured to apply tension to the multiple metal fibers between the mechanical anchor and the fiber feed system during the feeding. In the sixth embodiments or any other embodiment, the anchor comprises a mechanical clamp. In the sixth embodiments or any other embodiment, the anchor comprises a polymer structure into which the initial portions are embedded.

In the sixth embodiments or any other embodiment, an embedding surface of the embedding plate contacts the multiple metal fibers to apply pressure thereto, and at least one of a leading edge and a trailing edge of the embedding surface is curved or chamfered.

In the sixth embodiments or any other embodiment, the fiber feed system is thermally isolated from the embedding plate. In the sixth embodiments or any other embodiment, the fiber feed system is separated from the embedding plate by a gap.

In the sixth embodiments or any other embodiment, a cutting mechanism is disposed between the fiber feed system and the embedding plate.

In the sixth embodiments or any other embodiment, the FFF printer assembly and the MFC printer assembly are on opposite sides of a common support rail. In the sixth embodiments or any other embodiment, the FFF printer assembly and the MFC printer assembly are supported on separate support rails for independent positioning.

In the sixth embodiments or any other embodiment, the AM system further includes a controller that controls positioning of the FFF and MFC printer assemblies, operation of the FFF printer assembly to deposit polymer, and MFC printer assembly to simultaneously feed multiple metal fibers, embed the metal fibers into deposited polymer, and cut the metal fibers.

In one or more seventh embodiments, a variation of the one or more first embodiments employs non-metal fibers, such as optical fibers (i.e., glass), polymers having a higher melting temperature than the FFF deposited polymer, or other materials. Thus, in the seventh embodiments or any other embodiment, the AM method would include (a) depositing a layer of polymer structures using the FFF printer assembly comprising at least one nozzle. In the seventh embodiments or any other embodiment, the AM method can also include (b) using a fiber composite (FC) printer assembly, spaced from the at least one nozzle, to embed a continuous fiber (metal or non-metal) into one or more of the polymer structures of said layer. In the seventh embodiments or any other embodiment, (b) can include (b1) heating the continuous fiber to a temperature such that polymer adjacent the fiber melts, and applying pressure to the fiber using an embedding surface of the MFC printer assembly so as to embed the fiber into the one or more polymer structures.

It will be appreciated that the aspects of the disclosed subject matter can be implemented, fully or partially, in hardware, hardware programmed by software, software instruction stored on a computer readable medium (e.g., a non-transitory computer readable medium), or any combination of the above.

For example, components of the disclosed subject matter, including components such as a controller, process, or any other feature, can include, but are not limited to, a personal computer or workstation or other such computing system that includes a processor, microprocessor, microcontroller device, or is comprised of control logic including integrated circuits such as, for example, an application specific integrated circuit (ASIC).

Features discussed herein can be performed on a single or distributed processor (single and/or multi-core), by components distributed across multiple computers or systems, or by components co-located in a single processor or system. For example, aspects of the disclosed subject matter can be implemented via a programmed general purpose computer, an integrated circuit device, (e.g., ASIC), a digital signal processor (DSP), an electronic device programmed with microcode (e.g., a microprocessor or microcontroller), a hard-wired electronic or logic circuit, a programmable logic circuit (e.g., programmable logic device (PLD), programmable logic array (PLA), field-programmable gate array (FPGA), programmable array logic (PAL)), software stored on a computer-readable medium or signal, an optical computing device, a networked system of electronic and/or optical devices, a special purpose computing device, a semiconductor chip, a software module or object stored on a computer-readable medium or signal.

When implemented in software, functions may be stored on or transmitted over as one or more instructions or code on a computer-readable medium. The steps of a method or algorithm disclosed herein may be embodied in a processor-executable software module, which may reside on a computer-readable medium. Instructions can be compiled from source code instructions provided in accordance with a programming language. The sequence of programmed instructions and data associated therewith can be stored in a computer-readable medium (e.g., a non-transitory computer readable medium), such as a computer memory or storage device, which can be any suitable memory apparatus, such as, but not limited to read-only memory (ROM), programmable read-only memory (PROM), electrically erasable programmable read-only memory (EEPROM), random-access memory (RAM), flash memory, disk drive, etc.

As used herein, computer-readable media includes both computer storage media and communication media, including any medium that facilitates transfer of a computer program from one place to another. Thus, a storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a transmission medium (e.g., coaxial cable, fiber optic cable, twisted pair, digital subscriber line (DSL), or wireless technologies such as infrared, radio, and microwave), then the transmission medium is included in the definition of computer-readable medium. Moreover, the operations of a method or algorithm may reside as one of (or any combination of) or a set of codes and/or instructions on a machine readable medium and/or computer-readable medium, which may be incorporated into a computer program product.

One of ordinary skill in the art will readily appreciate that the above description is not exhaustive, and that aspects of the disclosed subject matter may be implemented other than as specifically disclosed above. Indeed, embodiments of the disclosed subject matter can be implemented in hardware and/or software using any known or later developed systems, structures, devices, and/or software by those of ordinary skill in the applicable art from the functional description provided herein.

In this application, unless specifically stated otherwise, the use of the singular includes the plural, and the separate use of "or" and "and" includes the other, i.e., "and/or." Furthermore, use of the terms "including," "having," or "formed of," as well as other forms such as "includes," "included," "has," or "had," are intended to have the same effect as "comprising" and thus should not be understood as limiting.

Any range described herein will be understood to include the endpoints and all values between the endpoints. Whenever "substantially," "approximately," "essentially," "near," or similar language is used in combination with a specific value, variations up to and including 10% of that value are intended, unless explicitly stated otherwise.

The foregoing descriptions apply, in some cases, to examples generated in a laboratory, but these examples can be extended to production techniques. Thus, where quantities and techniques apply to the laboratory examples, they should not be understood as limiting.

It is thus apparent that there is provided, in accordance with the present disclosure, systems and methods for additive manufacturing with continuous fibers, and structures formed using such systems and methods. Many alternatives, modifications, and variations are enabled by the present disclosure. While specific examples have been shown and described in detail to illustrate the application of the principles of the present invention, it will be understood that the invention may be embodied otherwise without departing from such principles. For example, disclosed features may be combined, rearranged, omitted, etc. to produce additional embodiments, while certain disclosed features may sometimes be used to advantage without a corresponding use of other features. Accordingly, Applicant intends to embrace all such alternative, modifications, equivalents, and variations that are within the spirit and scope of the present invention.

The invention claimed is:

1. An additive manufacturing system comprising:
    a fused filament fabrication (FFF) printer assembly with at least one polymer deposition nozzle; and
    a metal fiber composite (MFC) printer assembly constructed to simultaneously embed an array of multiple continuous metal fibers into deposited polymer structures by moving along a first direction,
    wherein the MFC printer assembly includes a fiber feed system that simultaneously feeds the multiple metal fibers to a deposition region as the MFC printer assembly moves along the first direction, and an embedding plate trailing the fiber feed system and constructed to apply at least pressure to the multiple metal fibers fed to the deposition region as the MFC printer assembly moves along the first direction,
    the embedding plate is constructed to heat the multiple metal fibers from the fiber feed system prior to or within the deposition region,
    the fiber feed system is thermally isolated from the embedding plate,
    the fiber feed system is separated from the embedding plate along the first direction by an open gap,
    the array of multiple continuous metal fibers exits the fiber feed system as separate metal fibers that do not contact each other and extend in parallel,
    the fiber feed system and the embedding plate are arranged such that each separate metal fiber exiting the fiber feed system extends across the open gap into contact with the embedding plate.

2. The additive manufacturing system of claim 1, wherein a portion of the fiber feed system is constructed to preheat the metal fibers prior to the deposition region.

3. The additive manufacturing system of claim 1, further comprising an anchor that holds initial portions of the multiple metal fibers fed from the fiber feed system.

4. The additive manufacturing system of claim 3, wherein the fiber feed system is configured to apply tension to the multiple metal fibers between the anchor and the fiber feed system during the feeding.

5. The additive manufacturing system of claim 3, wherein the anchor comprises a mechanical clamp.

6. The additive manufacturing system of claim 3, wherein the anchor comprises a polymer structure into which the initial portions are embedded.

7. The additive manufacturing system of claim 1, wherein an embedding surface of the embedding plate contacts the multiple metal fibers to apply pressure thereto, and at least one of a leading edge and a trailing edge of the embedding surface is curved or chamfered.

8. The additive manufacturing system of claim 1, wherein the FFF printer assembly and the MFC printer assembly are on opposite sides of a common support rail.

9. The additive manufacturing system of claim 1, wherein the FFF printer assembly and the MFC printer assembly are supported on separate support rails for independent positioning.

10. The additive manufacturing system of claim 1, further comprising a controller that controls positioning of the FFF and MFC printer assemblies, operation of the FFF printer assembly to deposit polymer, and MFC printer assembly to simultaneously feed multiple metal fibers, embed the metal fibers into deposited polymer, and cut the metal fibers.

11. The additive manufacturing system of claim 1, wherein the embedding plate comprises:
    a first surface portion at a leading end of the embedding plate, the leading end facing the open gap, the first surface portion being curved; and
    a second surface portion disposed between the leading end and a trailing end of the embedding plate along the first direction, the second surface portion being parallel to the first direction.

12. The additive manufacturing system of claim 1, wherein the fiber feed system comprises first and second drive gears, each of the metal fibers extending between the first and second drive gears, and wherein, in a side view, the first drive gear, the second drive gear, the open gap, and the embedding plate are arranged in order on a line parallel to the first direction.

13. An additive manufacturing system comprising:

a fused filament fabrication (FFF) printer assembly with at least one polymer deposition nozzle; and a metal fiber composite (MFC) printer assembly constructed to simultaneously embed multiple continuous metal fibers into deposited polymer structures, wherein the MFC printer assembly includes a fiber feed system that simultaneously feeds the multiple metal fibers to a deposition region, and an embedding plate at a trailing portion of the fiber feed system and constructed to apply at least pressure to the multiple metal fibers fed to the deposition region, and a cutting mechanism is disposed between the fiber feed system and the embedding plate, wherein the fiber feed system is spaced from a leading end of the embedding plate by a horizontal gap, and the cutting mechanism is disposed so as to sever metal fibers extending across the horizontal gap.

14. The additive manufacturing system of claim 13, wherein the fiber feed system comprises first and second drive gears, each of the metal fibers extending between the first and second drive gears, and wherein, in a side view, the horizontal gap is disposed along a horizontal direction between the second drive gear and the embedding plate.

15. An additive manufacturing system comprising:

a fused filament fabrication (FFF) printer assembly with at least one polymer deposition nozzle; and a metal fiber composite (MFC) printer assembly constructed to simultaneously embed multiple continuous metal fibers into deposited polymer structures, wherein the MFC printer assembly includes a fiber feed system that simultaneously feeds the multiple metal fibers to a deposition region, and an embedding plate at a trailing portion of the fiber feed system and constructed to apply at least pressure to the multiple metal fibers fed to the deposition region;

the embedding plate is constructed to heat the multiple metal fibers from the fiber feed system prior to or within the deposition region;

the fiber feed system is thermally isolated from the embedding plate;

the fiber feed system is separated from the embedding plate by a gap;

the embedding plate has a trailing surface and a leading surface between the trailing surface and the fiber feed system along a horizontal direction;

the trailing surface extends substantially parallel to the horizontal direction;

the leading surface is tilted at an angle with respect to the trailing surface;

the leading surface is constructed to contact and preheat the metal fibers from the fiber feed system prior to the metal fibers being fed to the deposition region; and the trailing surface is constructed to contact and push the preheated metal fibers from the leading surface into an underlying polymer build layer in the deposition region.

* * * * *